(12) United States Patent
Koehler

(10) Patent No.: US 11,871,153 B1
(45) Date of Patent: Jan. 9, 2024

(54) METHOD FOR MANAGING GRAPHIC USER INTERFACE (GUI) FOR VIDEO CONFERENCE CALLS

(71) Applicant: Juergen Koehler, Algermissen (DE)

(72) Inventor: Juergen Koehler, Algermissen (DE)

( * ) Notice: Subject to any disclaimer, the term of this patent is extended or adjusted under 35 U.S.C. 154(b) by 0 days.

(21) Appl. No.: 18/194,470

(22) Filed: Mar. 31, 2023

(51) Int. Cl.
*H04N 7/15* (2006.01)
*G06F 3/04845* (2022.01)
*G06F 3/038* (2013.01)
*G06F 3/0482* (2013.01)

(52) U.S. Cl.
CPC ............ *H04N 7/157* (2013.01); *G06F 3/038* (2013.01); *G06F 3/0482* (2013.01); *G06F 3/04845* (2013.01); *H04N 7/152* (2013.01); *H04N 7/155* (2013.01)

(58) Field of Classification Search
None
See application file for complete search history.

(56) References Cited

U.S. PATENT DOCUMENTS

| | | | |
|---|---|---|---|
| 9,544,538 B2 * | 1/2017 | Cahill | H04N 5/265 |
| 9,733,886 B2 | 8/2017 | Lieb et al. | |
| 11,319,060 B2 * | 5/2022 | Cottet | B64C 1/10 |
| 2015/0180919 A1 * | 6/2015 | Brunson | H04L 65/4046 709/204 |
| 2016/0072863 A1 * | 3/2016 | Wu | H04L 65/403 715/753 |
| 2017/0353694 A1 * | 12/2017 | Yoakum | G06F 3/165 |
| 2022/0150288 A1 * | 5/2022 | Tokuchi | H04N 21/4781 |

FOREIGN PATENT DOCUMENTS

| | | |
|---|---|---|
| EP | 0616448 B1 | 2/2004 |
| WO | 2012166827 A2 | 4/2014 |

* cited by examiner

*Primary Examiner* — Stella L. Woo

(57) ABSTRACT

A system and method is used to manage GUI for group video calls. The method ensures effective communication and control over shared video content during group video calls. The method enables to combine feed videos from a plurality of attendee accounts and other shared video content to be displayed in one single slide. Further, the method allows control over slide presentations and positioning of participant videos by cursor movement of the host account holder or the presenter. This allows the participants to follow the presenter, while viewing the presentation slides and other feed videos. Furthermore, the method allows users to switch mouse cursor control between the presenter and the participants by clicking on the video on a primary slot. Additionally, the presenter as well as the participants may individually select background views as well as arrangement patterns for videos of attendees of the video conference, from a selection of patterns.

17 Claims, 22 Drawing Sheets

METHOD FOR MANAGING GRAPHIC USER INTERFACE (GUI) FOR VIDEO CONFERENCE CALLS

FIELD OF THE INVENTION

The present invention relates generally to a method for managing GUI (graphic user interface) for group video calls. More specifically, the present invention provides a system and a method that facilitates users to arrange host and participant videos on a desktop, tablet, or mobile display with various backgrounds such as presentation slides, documents, videos, photos etc.

BACKGROUND OF THE INVENTION

Impact of video conferencing in business works to break down both figurative and literal barriers across every interaction or exchange. After being faced with a global pandemic, people had no other choice than to virtually get closer, reshape business online, and rely on video conferencing solutions for higher education. Although the technology behind video calls has been around for decades, only in the last ten to fifteen years has the technology cemented itself as a critical element of business communications and online teaching. Current applications in the field of video conferencing only allows the host to interact with a presentation slide or background display. In most video/virtual conference applications, the host video and the participants' videos would be separated from any presentation slides that the host might be sharing, making it difficult for effective interactions between the host and the participants. In contrast, in certain other applications, where there are more than three participants and all the participants have access to the presentation slides, the participants might scroll through the presentation at the same time which would lead to confusion and chaos.

An objective of the present invention is to provide a system and a method for managing GUI for group video calls, wherein the present invention can address the above-mentioned problems. By utilizing the present invention, all attendees of a video call can ensure that effective communication and control over shared video content would be made possible. The present invention combines several aspects of mouse movements, remotely controlling presentation slides, sharing previous conference videos, switching control of presentation pointer, bringing all user videos and slides together into one slide, etc. into one tool.

SUMMARY OF THE INVENTION

The present invention provides a system and a method of managing GUI for group video calls. By utilizing the present invention, all attendees of a video call can ensure that effective communication and control over shared video content is made possible without creating confusion and disturbance in group calls. In a preferred embodiment, the system of the present invention enables to combine participant videos, host video, and other shared video content to be displayed in one single slide. Further, the present invention allows control over slide presentations and positioning of the other participant videos by cursor movement of the host or the presenter. This allows the participants to follow the presenter (host), while viewing the presentation slides and the user videos together at the same time. Furthermore, the present invention allows users to switch mouse cursor control, between the presenter and the participants by clicking on the video of the presenter. Additionally, the presenter as well as the participants may individually select background views as well as arrangement patterns for videos of attendees of the video conference, from a selection of patterns. Thus, the present invention is a simple and user-friendly system and method, that enables efficient management of GUI for group virtual conference calls.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 1:
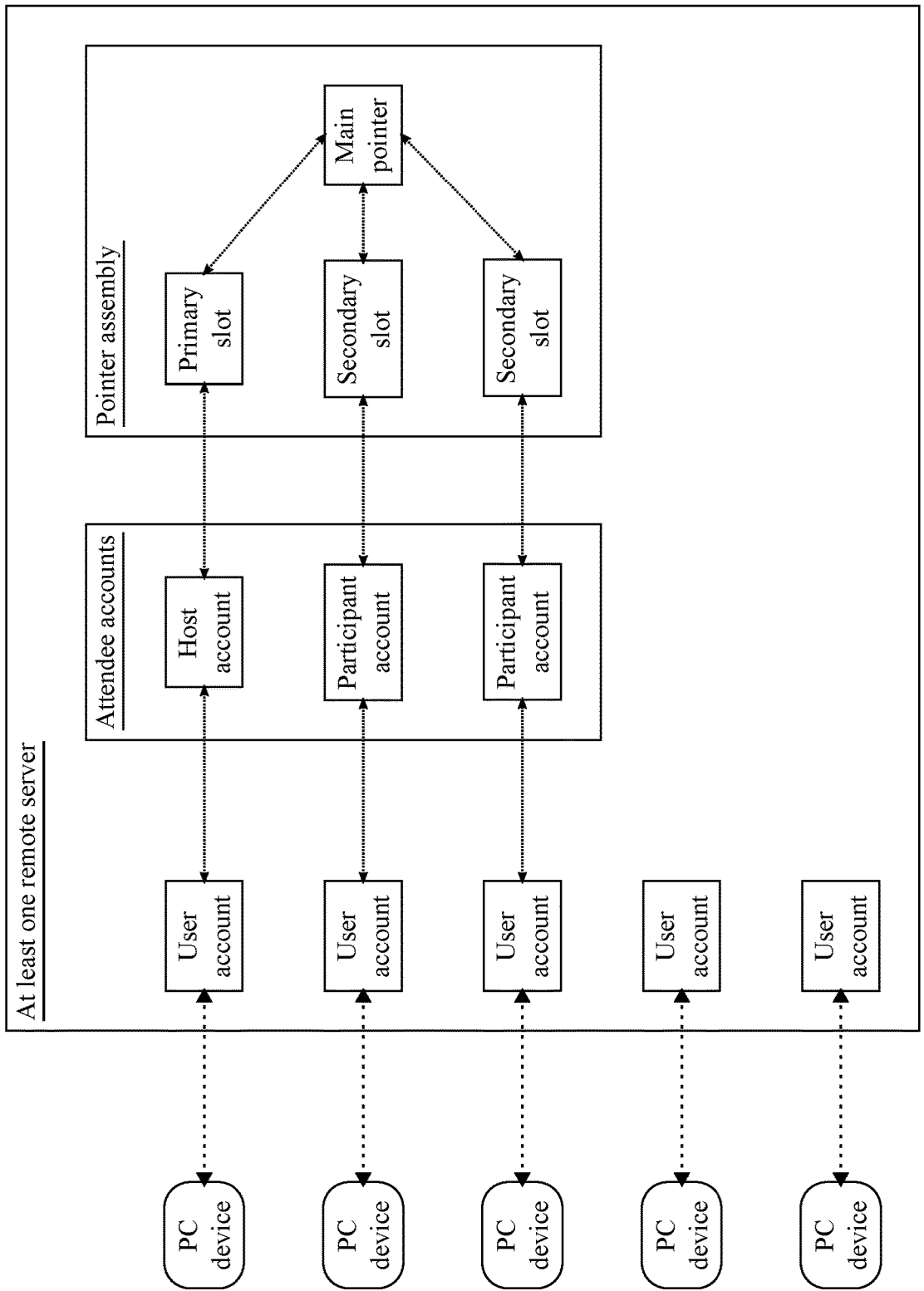
FIG. 1 is a schematic view showing the overall system of the present invention.
Figure 6:
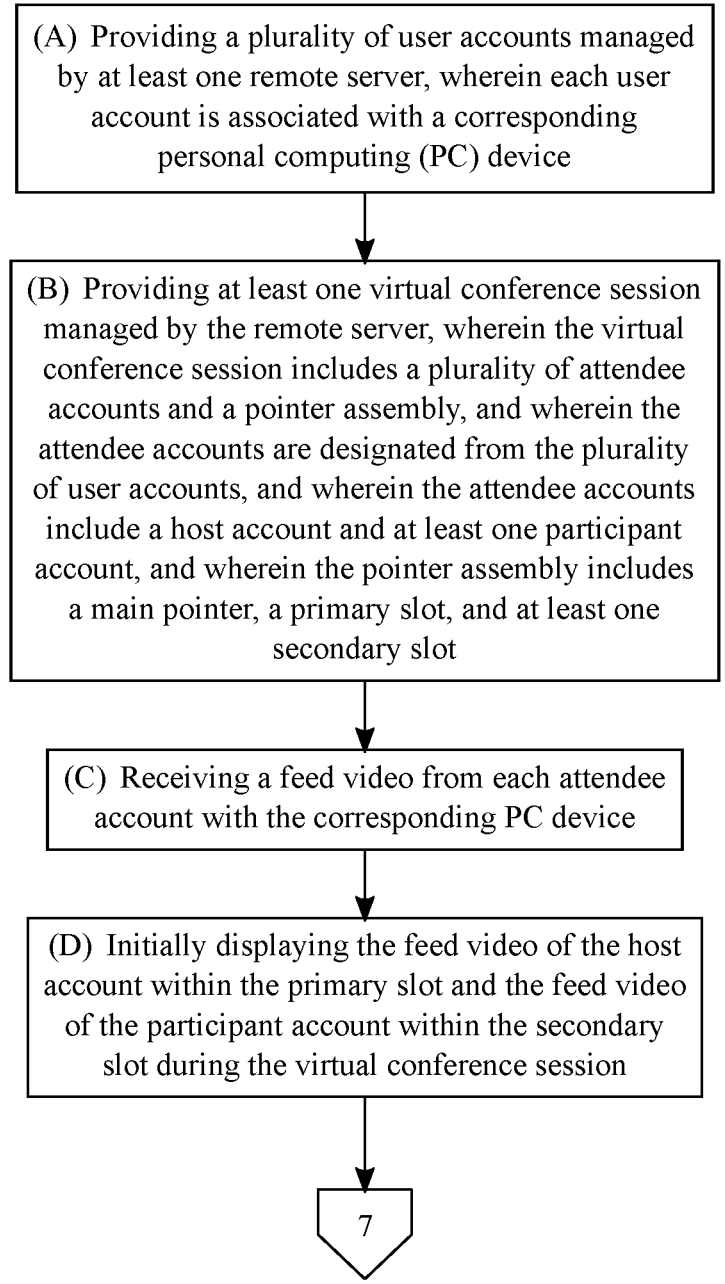
FIG. 6 is a flowchart depicting the overall process of the present invention.
Figure 7:
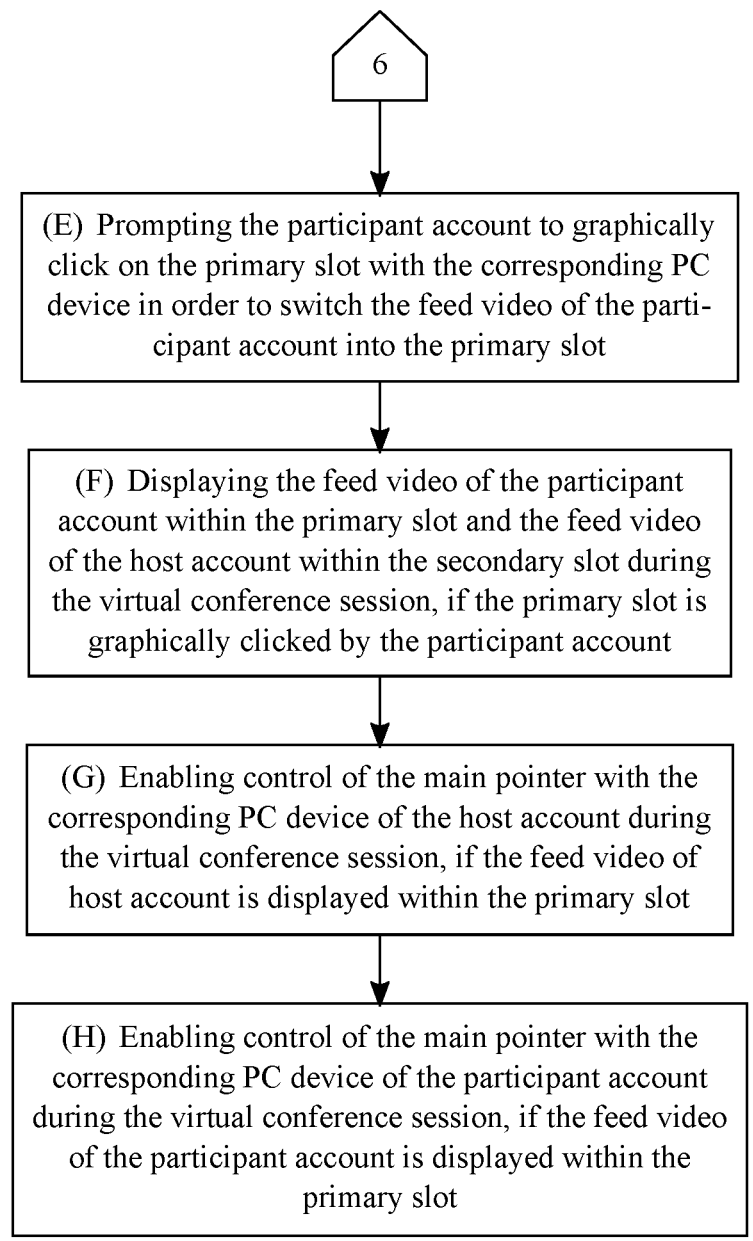
FIG. 7 is a flowchart depicting the continuation of the overall process of the present invention.

The present invention provides a system and a method of managing GUI for group video calls. The present invention enables to combine participant videos, host video, and other shared video content to be displayed in one single slide. The present invention also allows slide presentation and positioning of other participant videos to be controlled by a cursor movement of the host or the presenter. The following description is in reference to FIG. 1 through FIG. 22. As can be seen in FIG. 1, FIG. 6 and FIG. 7, the system used to implement the method of the present invention is provided with a plurality of user accounts managed by at least one remote server (Step A). Each of the plurality of user accounts is associated with a corresponding user personal computing (PC) device. More specifically, each of the plurality of user accounts is tied to a single user who is able to interact, participate, and operate the corresponding user PC device during a group video call. The corresponding user PC device allows a user to interact with the present invention and can be, but is not limited to, a smart-phone, a laptop, a desktop, or a tablet PC. To that end, the present invention works on operating systems, mobile applications, and/or may be embedded into websites. The remote server is used to facilitate communication between the plurality of user accounts. Moreover, the remote server is used to execute a number of internal processes for the present invention and is used to store message data.

In order to accomplish the above-mentioned functionalities, the system used to execute the method of the present invention further provides at least one virtual conference session managed by the remote server (Step B). The virtual conference session is an online interactive session where group video or audio calls are conducted between a selected number of users. Further, the virtual conference session may apply to audio only applications, video only applications, or a mix of some users using audio and some users using video. The virtual conference session includes a plurality of attendee accounts and a pointer assembly. The attendee accounts are the user accounts of the selected number of users that choose to participate in the virtual conference session and are consequently designated from the plurality of user accounts. The attendee accounts include a host account and at least one participant account. In the preferred embodiment, the host account is tied to the user who initially logs in to the system through the corresponding PC device and creates an online conference room or workspace to conduct the virtual conference session. The specific URL (uniform resource locator) for the online conference room is shared as part of an invitation by the host account to the participant account. A user of the participant account enters the virtual conference session after accepting the invitation through the corresponding PC device. In an alternate embodiment, the virtual conference session may also comprise asynchronous group calls, wherein each user of the participant account joins at different time. According to the preferred embodiment, the pointer assembly includes a main pointer, a primary slot, and at least one secondary slot. The pointer assembly is an arrangement pattern for feed videos of the attendees of the virtual conference session. More specifically, the primary slot and the secondary slot are used to display the feed videos of the attendee accounts from their corresponding PC device. The primary slot is graphically configured in relation to the main pointer in order to show the visual primacy of its feed video over the feed video shown in the secondary slot. In the preferred embodiment, the main pointer is a circular dot that is associated with each arrangement pattern and clicking on the main pointer allows a user to move the pointer assembly anywhere along the slide or background of the virtual conference session.

In order to accomplish the functionalities of the present invention, the overall process of the present invention begins by receiving a feed video from each attendee account with the corresponding PC device (Step C). A feed video is a live video/audio recording that is streamed from the camera and/or microphone of each attendee from their corresponding PC. To that end, when the host account enables access to a camera and/or microphone of the corresponding PC device, the host account enters the virtual conference session with their feed video. Similarly, when the participant account enables access to a camera and/or microphone of the corresponding PC device, the participant account enters the virtual conference session. In other words, when the camera access for the corresponding PC device of each of the attendee account is turned on, the feed video of each attendee account is activated. However, the feed video may be a photograph, a picture, or any visual or audio content that each attendee decides to share with their corresponding PC device.

Figure 2:
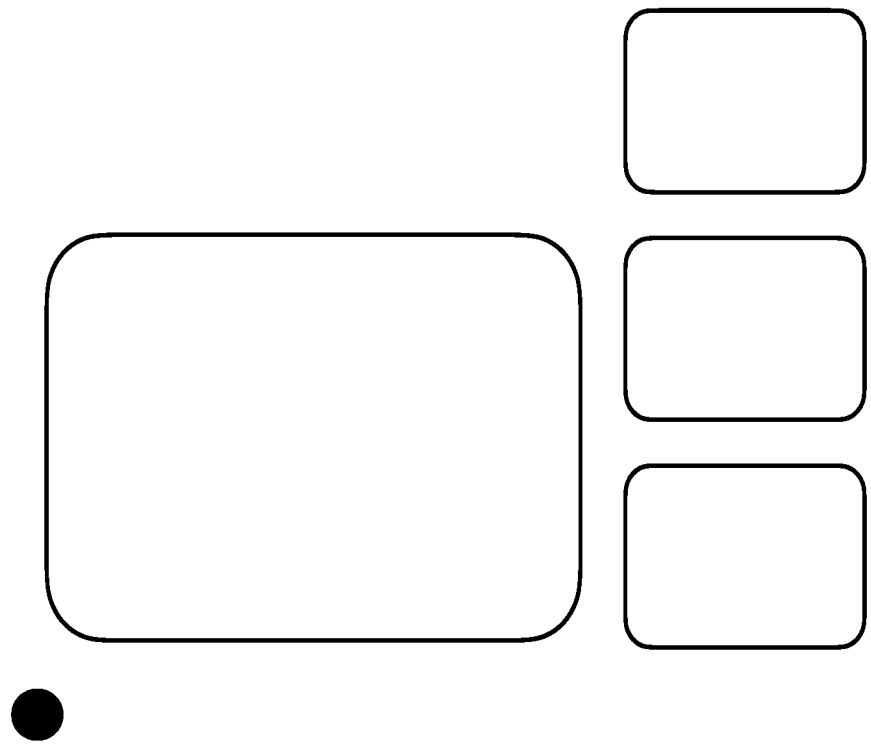
FIG. 2 is a schematic view of a pointer assembly according to a first embodiment, wherein the primary slot and the secondary slot have rectangular shape.
Figure 3:
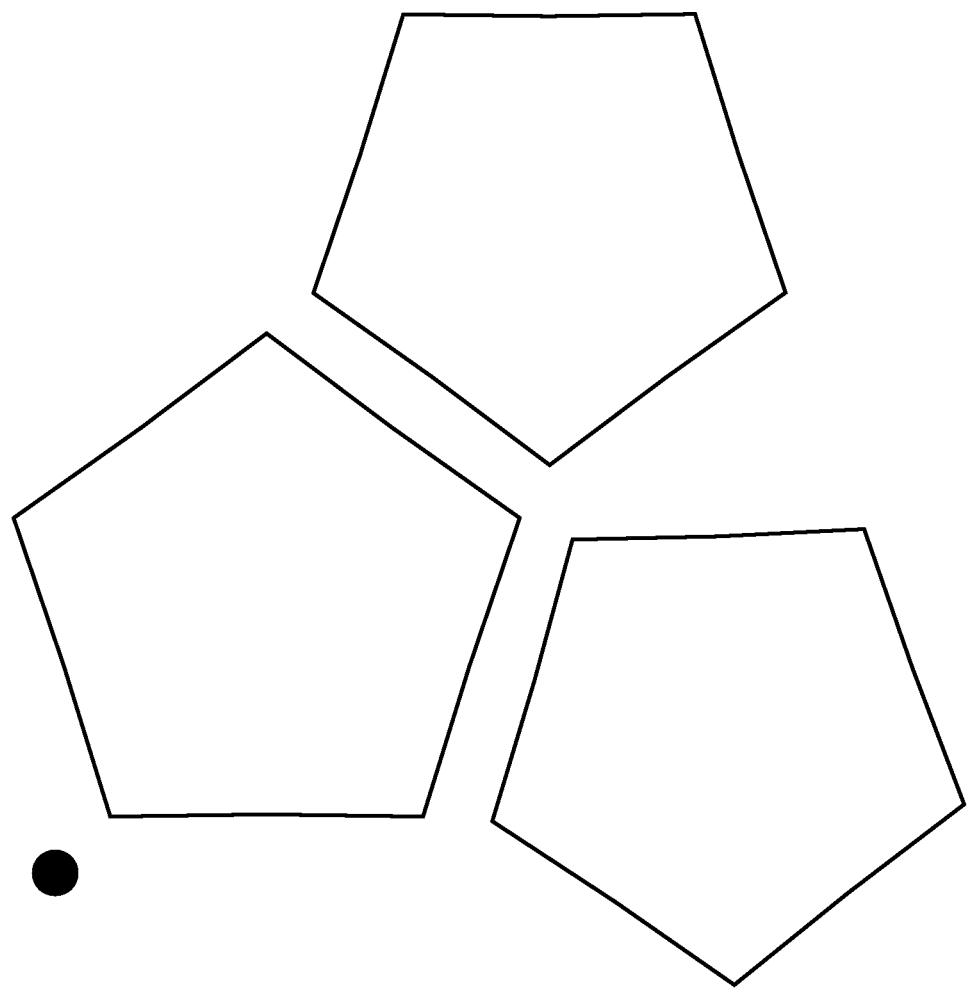
FIG. 3 is a schematic view of the pointer assembly according to a second embodiment, wherein the primary slot and the secondary slot are hexagonal in shape.
Figure 4:
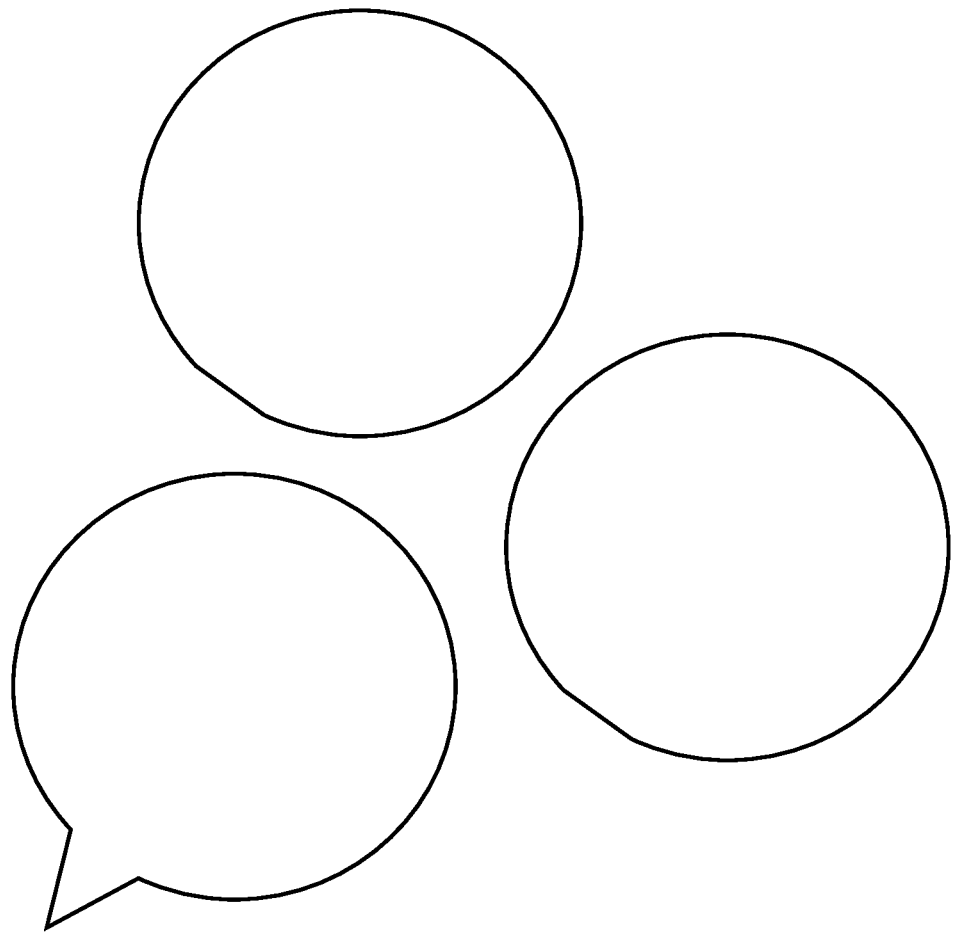
FIG. 4 is a schematic view of the pointer assembly according to a third embodiment, wherein the primary slot is in the shape of a dialogue bubble, the secondary slot is circular, and there is no main pointer.

As can be seen in FIG. 6, the overall process of the present invention continues by initially displaying the feed video of the host account within the primary slot and the feed video of the participant account within the secondary slot during the virtual conference session (Step D). In other words, the primary slot is the graphical space where the host account's video is displayed initially, and the at least one secondary slot is the graphical space where the at least one participant account's video is initially displayed. As seen in FIG. 2 through FIG. 4, these contrastable graphical spaces enable easier identification of the feed video of the host account from the rest of the feed video of the participant account, within the pointer assembly.

It is an aim of the present invention to enable switching or transferring of control between the plurality of attendees in the virtual conference session, so that effective communication and interaction may be made possible among the attendees during a presentation. Accordingly, the overall process of the present invention continues by prompting the participant account to graphically click on the primary slot with the corresponding PC device in order to switch the feed video of the participant account into the primary slot (Step E). For example, if a host X is displaying a presentation slide in the background and a participant Y has something to contribute in reference to the presentation slide, or if participant Y has something completely different to share from corresponding PC of participant Y to the plurality of attendees, participant Y can take control of the meeting by clicking on the video of the current host X in the primary slot.

The overall process of the present invention continues by displaying the feed video of the participant account within the primary slot and the feed video of the host account within the secondary slot during the virtual conference session (Step F), if the primary slot is graphically clicked by the participant account. Continuing with the previous example, if participant Y clicks on the video of host X within the primary slot, the feed videos switch and now the feed video of participant Y from the corresponding PC device of participant Y is placed within the primary slot and the feed video of initial host X from the corresponding PC device of host X is placed within the secondary slot. Thus, participant Y is able to now lead the virtual conference session.

Control of the virtual conference session further implies control of the pointer assembly. As can be seen in FIG. 7, the overall process of the present invention further continues by enabling control of the main pointer with the corresponding PC device of the host account during the virtual conference session (Step G), if the feed video of host account is displayed within the primary slot. This is so that, the host account who is in charge of leading the virtual conference session may move the pointer assembly anywhere around the display page. This feature is beneficial because depending on the presentation slide or any other video feed that the host account is displaying, the host may need to move the pointer assembly for better view or better access. Further, the pointer assembly may be moved just based on positional preference of a user of the host account. More specifically, controlling of the main pointer would be enabled to the host account only if the feed video of host account is displayed within the primary slot.

As previously discussed, anyone from the plurality of attendee accounts may take control of the virtual conference session by graphically clicking on the video in the primary slot, according to the present invention. Accordingly, the overall process of the present invention further continues by enabling control of the main pointer with the corresponding PC device of the participant account during the virtual conference session (Step H), if the feed video of the participant account is displayed within the primary slot. Continuing with the previous example, control switch happens when participant Y clicks on the primary slot. Subsequently, the primary slot now carries participant Y's video feed. Accordingly, the control of the presentation is now in the hands of participant Y and hence participant Y can now control the main pointer as well with the corresponding PC device of participant Y, so as to effectively communicate with other attendees of the meeting.

Figure 8:
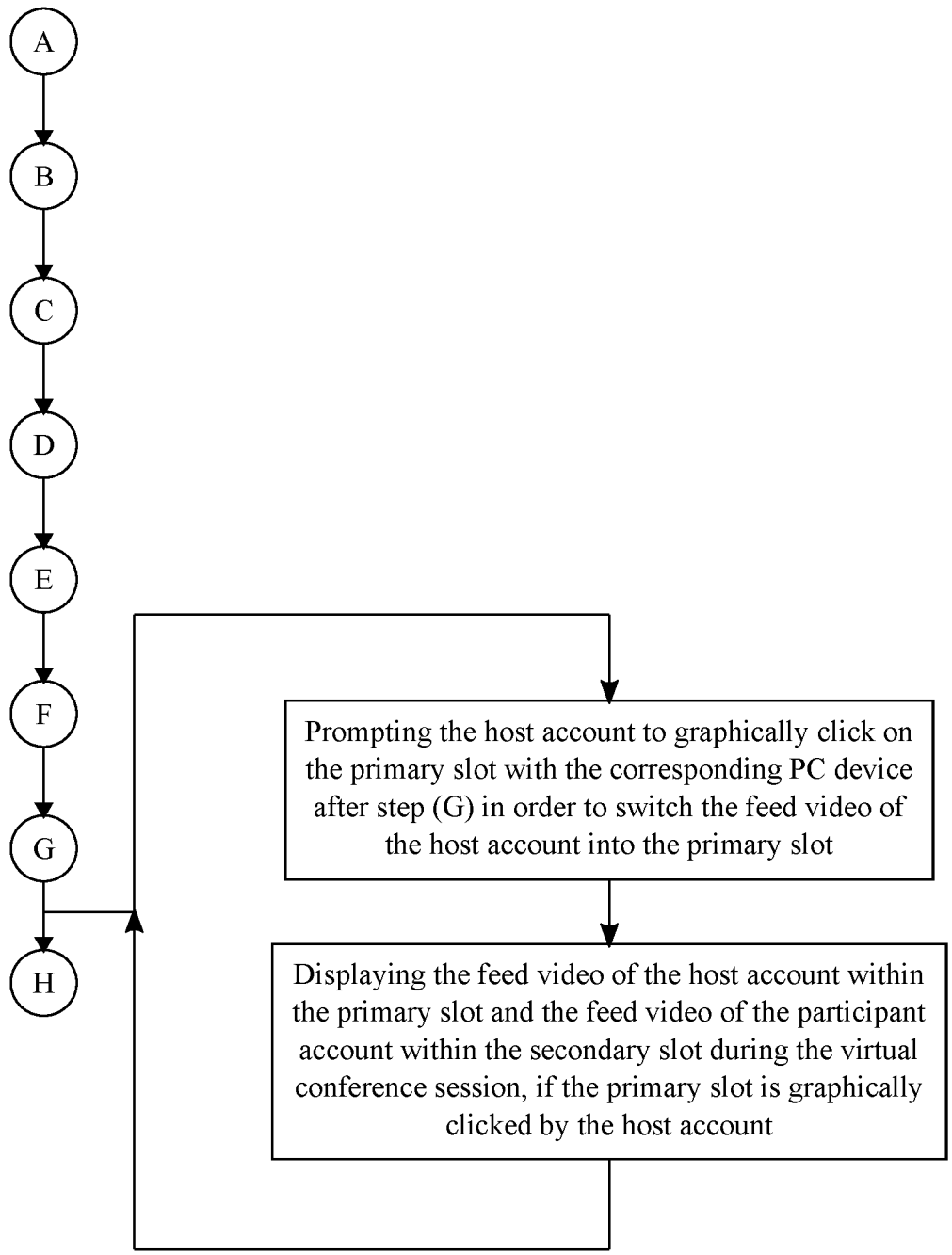
FIG. 8 is a flowchart depicting a subprocess of displaying feed video of host account and participant account within the pointer assembly.

As can be seen in FIG. 8, a subprocess of the present invention comprises the steps of prompting the host account to graphically click on the primary slot with the corresponding PC device after Step G in order to switch the feed video of the host account into the primary slot. For example, if the host X wants to take over control of the virtual conference session back from participant Y, then the host X has to graphically click on the primary slot with the corresponding PC device of the host account. The subprocess continues by displaying the feed video of the host account within the primary slot and the feed video of the participant account within the secondary slot during the virtual conference session, if the primary slot is graphically clicked by the host account. In other words, based on the previous example, following clicking of the primary slot, the feed video from corresponding PC device of the host X is displayed in the primary slot and the feed video from the corresponding PC device of participant Y is displayed in the secondary slot.

Figure 9:
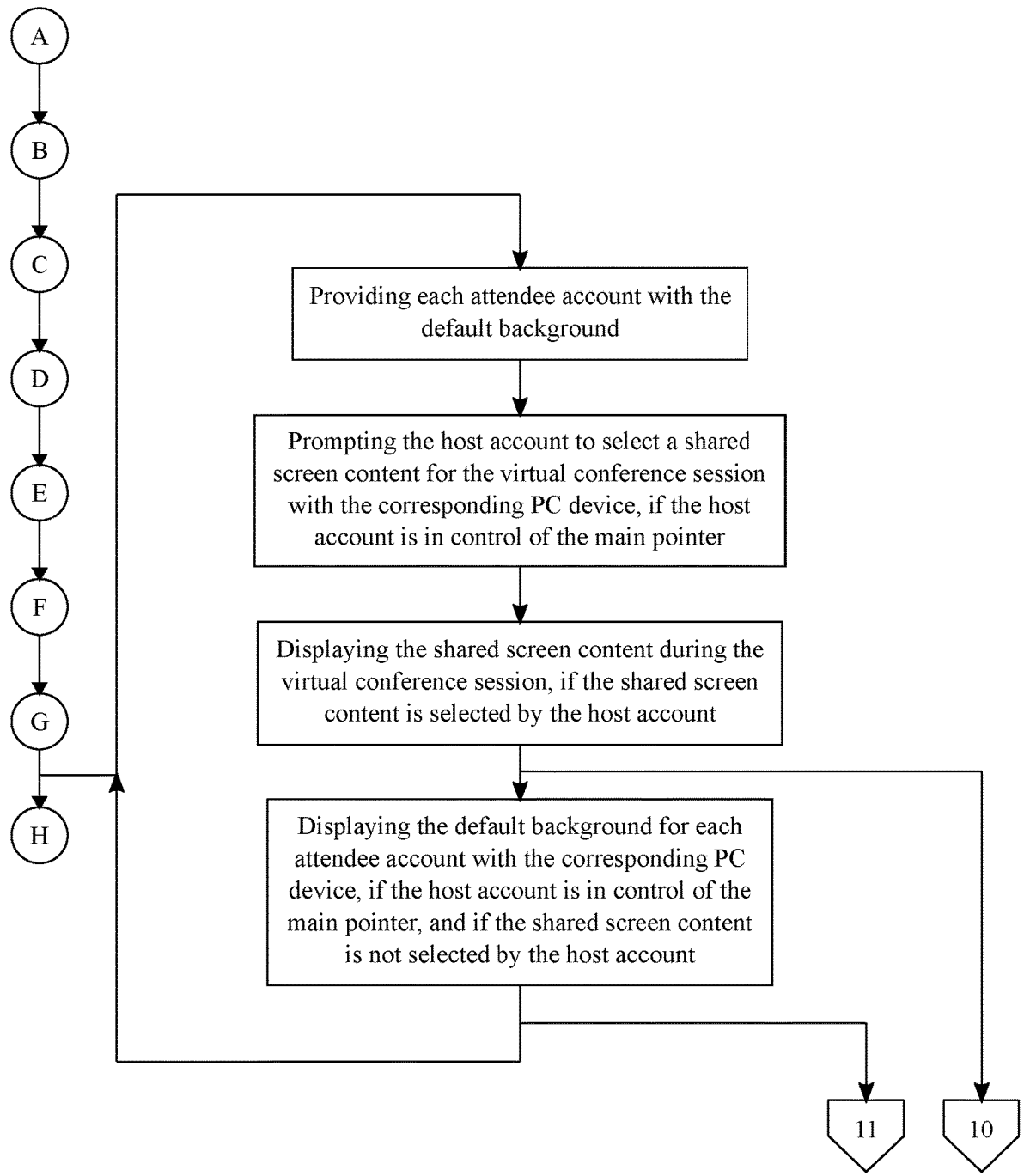
FIG. 9 is a flowchart depicting a subprocess of displaying shared screen content and default background by the host account during the virtual conference session.

As can be seen in FIG. 9, a subprocess of the present invention comprises the steps of providing each attendee account with a default background. A default background can be a still picture, a motion picture, a 3D (three dimensional) picture, a pattern, or a blank page that the corresponding PC of each attendee account is provided with. The subprocess continues by prompting the host account to select a shared screen content for the virtual conference session with the corresponding PC device, if the host account is in control of the main pointer. Shared screen content is a display material that the host account selects with the corresponding PC to be shared with the rest of the attendees. Examples of the shared screen content include, but are not limited to, a webpage, a presentation slide, a video, a picture, etc. The plurality of attendees may interact using a mouse follow mechanism, and/or audio interaction, and/or video interaction. To that end, the present invention enables the plurality of attendees to browse a website together while being on a phone call or in a separate video or audio conference call such as Slack, Huddle, or Zoom.

To accomplish this, the host account must be in control of the main pointer and the feed video of the host account must be displayed in the primary slot. Accordingly, the subprocess continues by displaying the shared screen content during the virtual conference session, if the shared screen content is selected by the host account. In other words, once the host account is in control of the main pointer and is leading the virtual conference session, the host account selects and displays the shared screen content with the rest of the attendees during the virtual conference session. Furthermore, the subprocess continues by displaying the default background for each attendee account with the corresponding PC device, if the host account is in control of the main pointer, and if the shared screen content is not selected by the host account. In other words, if the host account has not selected any shared screen content, the corresponding PC device of each of the attendees displays only the default background that was initially provided by their corresponding PC device. For example, if participant Y has a yellow flower as the default background, and host X selects a presentation ABC as the shared screen content, then the corresponding PC device of all the attendee accounts, including participant Y displays the presentation slide ABC as the background of the virtual conference session. If the host X has not selected any shared screen content, the corresponding PC device of participant Y displays the yellow flower as the background for the virtual conference session. The shared screen content is applicable on websites (for co-browsing), in collaborative applications such as Google Docs, and in Operating Systems for remote control operations. In all such cases, the participants are grouped together and can switch control to follow the mouse or tap movements of the primary slot.

Figure 10:
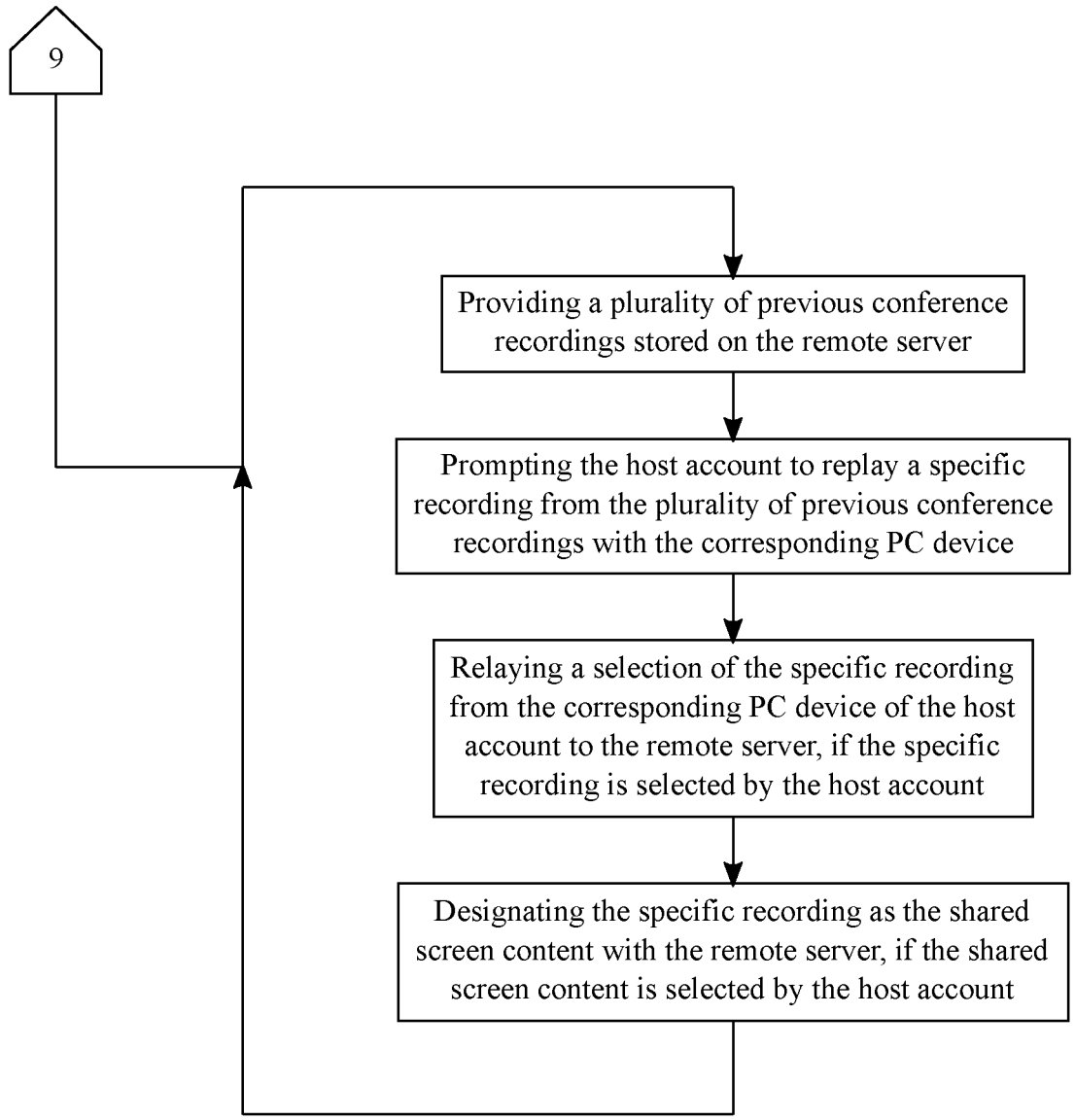
FIG. 10 is a flowchart depicting a subprocess of relaying a previous conference recording as a shared screen content by the host account.

In reference to FIG. 10, a subprocess of the present invention comprises the steps of providing a plurality of previous conference recordings stored on the remote server. In other words, the present invention enables access to previous conference recordings during the virtual conference session. Accordingly, the subprocess continues by prompting the host account to replay a specific recording from the plurality of previous conference recordings with the corresponding PC device. For example, the host account X may have a tab or button visible on the default background of the corresponding PC, from where the host account X can access the plurality of previous conference recordings and select a specific recording or any single recording by clicking a button or thumbnail associated with that specific recording. Further, the subprocess continues by relaying a selection of the specific recording from the corresponding PC device of the host account to the remote server, if the specific recording is selected by the host account. In other words, once the host account selects the specific recording from the plurality of previous conference recordings, that specific recording is relayed or transferred from the host account to the remote server, so that the specific recording may be streamed to the plurality of attendee accounts. To that end, the subprocess continues by designating the specific recording as the shared screen content with the remote server, if the shared screen content is selected by the host account. In other words, selection of the specific recording is followed by sharing of the specific recording as the shared screen content of the virtual conference session. This is so that the plurality of attendee accounts may be reminded of what happened in a previous video conference and subsequent action in reference to that previous video conference may be taken during the course of the current virtual conference session.

In an alternate embodiment, users can participate in asynchronous meetings. For example, according to this alternate embodiment, if User A records a session where User A is going through slides, a website, screen sharing, or any other collaborative space and sends the recording to User B. Subsequently, User B can view and reply. Further, after each session the other participating users receive a notification to view the added responses.

In another alternate embodiment, the virtual conference session may include a control button visible for each of the plurality of attendee accounts, wherein the control button enables to switch between the pointer assembly view and a dispersed view (all participants move freely). In other words, the control button is an on/off switch or a group/ungroup button that enables to switch between views. More specifically, when the host account clicks on the control button for ungrouping, the plurality of feed videos moves freely along the default background. Similarly, if any of the participant account clicks the control button for grouping, the plurality of feed videos comes adjacent to one another in one of the proposed positions.

Figure 11:
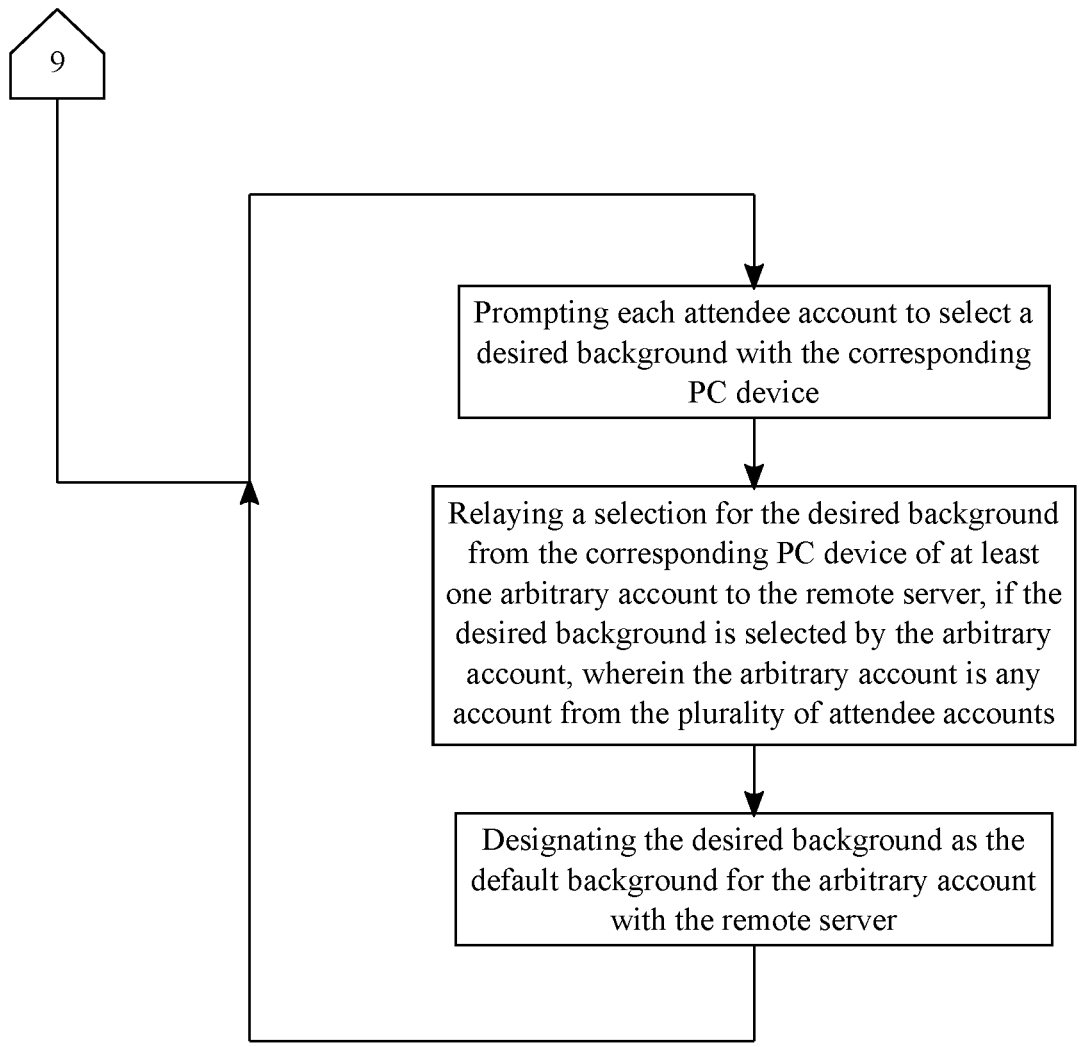
FIG. 11 is a flowchart depicting a subprocess of selecting and designating a desired background as the default background.

As can be seen in FIG. 11, a sub-process of the present invention comprises the steps of prompting each attendee account to select a desired background with the corresponding PC device. The desired background is a background for the virtual conference session that each attendee account can select with their corresponding PC device. Accordingly, the sub-process continues by relaying a selection for the desired background from the corresponding PC device of at least one arbitrary account to the remote server, if the desired background is selected by the arbitrary account, wherein the arbitrary account is any account from the plurality of attendee accounts. In other words, any user from the plurality of attendee accounts can select the desired background with the help of the remote server, and that selection is relayed to the corresponding PC device of that arbitrary account. For example, if an arbitrary account Z from the plurality of attendee accounts selects the photo of an elephant as the desired background, then desired background of the elephant's photograph is relayed only to the corresponding PC device of arbitrary account Z. Further, the sub-process continues by designating the desired background as the default background for the arbitrary account with the remote server. In other words, the above sub-process of the present invention allows each of the plurality of attendee accounts to select a background of their choice as the background for the virtual conference session regardless of what the default background of their corresponding PC is. For example, if participant Y has a yellow flower as the default background on the corresponding PC, and if participant Y chooses a red bird as the desired background, then the red bird is set as the default background on the corresponding PC of participant Y for the virtual conference session.

Figure 12:
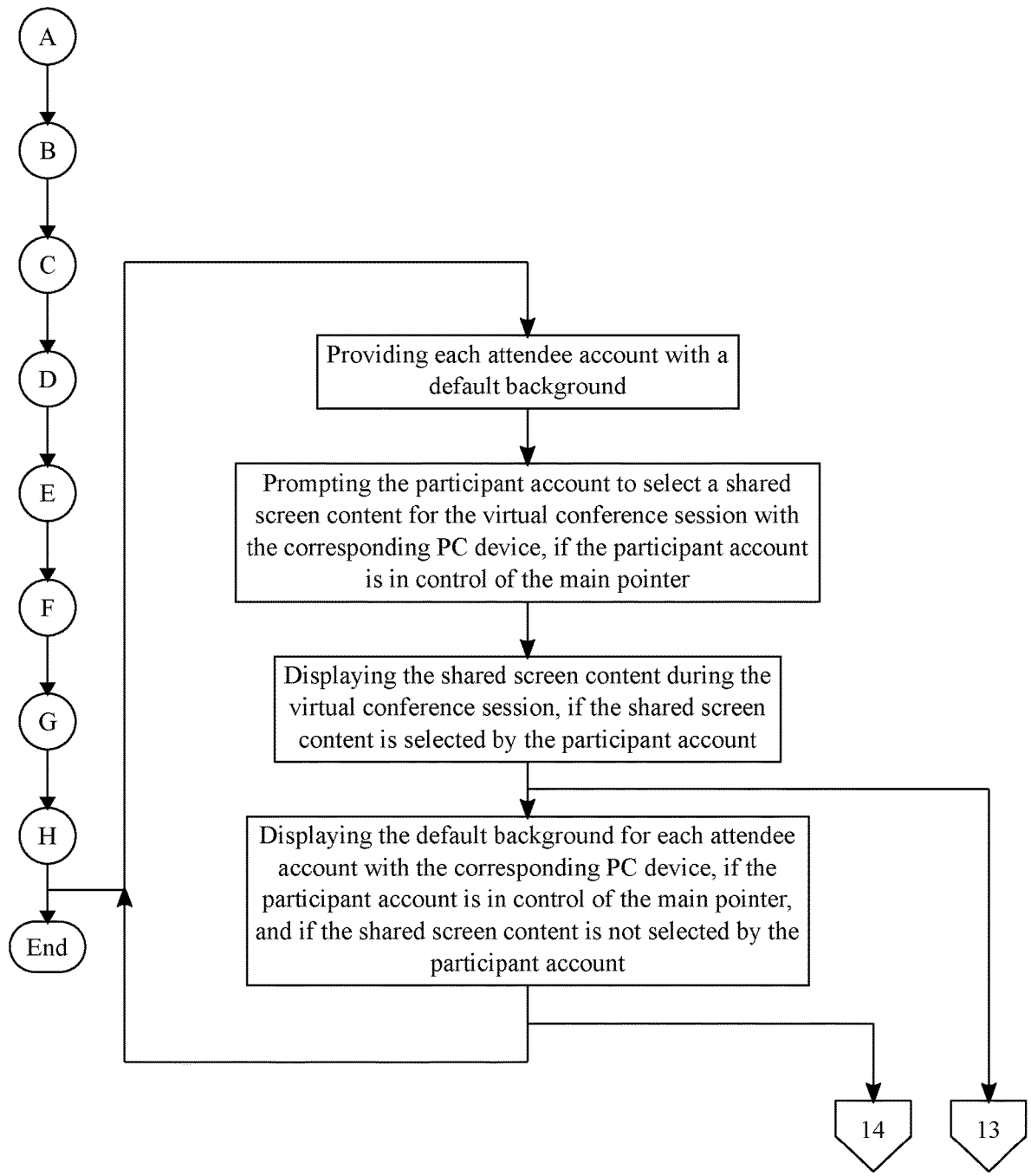
FIG. 12 is a flowchart depicting a subprocess of displaying shared screen content and default background by the participant account during the virtual conference session.

As can be seen in FIG. 12, a sub-process of the present invention comprises the steps of providing each attendee account with a default background. A default background can be a still picture, a motion picture, a 3D (three dimensional) picture, a pattern, or a blank page that the corresponding PC of each attendee account is provided with. The sub-process continues by prompting the participant account to select a shared screen content for the virtual conference session with the corresponding PC device, if the participant account is in control of the main pointer. Shared screen content is a display material that the participant account selects with the corresponding PC to be shared with the rest of the attendees. Examples of the shared screen content include, but are not limited to, a webpage, a presentation slide, a video, a picture, etc. To accomplish this, the participant account must be in control of the main pointer and the feed video of the participant account must be displayed in the primary slot. Accordingly, the sub-process continues by displaying the shared screen content during the virtual conference session, if the shared screen content is selected by the participant account. In other words, once the participant account is in control of the main pointer and is leading the virtual conference session, the participant account selects and displays the shared screen content with the rest of the attendees during the virtual conference session. Furthermore, the sub-process continues by displaying the default background for each attendee account with the corresponding PC device, if the participant account is in control of the main pointer, and if the shared screen content is not selected by the participant account. In other words, if the participant account has not selected any shared screen content, the corresponding PC device of each of the attendees displays only the default background that was initially provided by their corresponding PC device.

Figure 13:
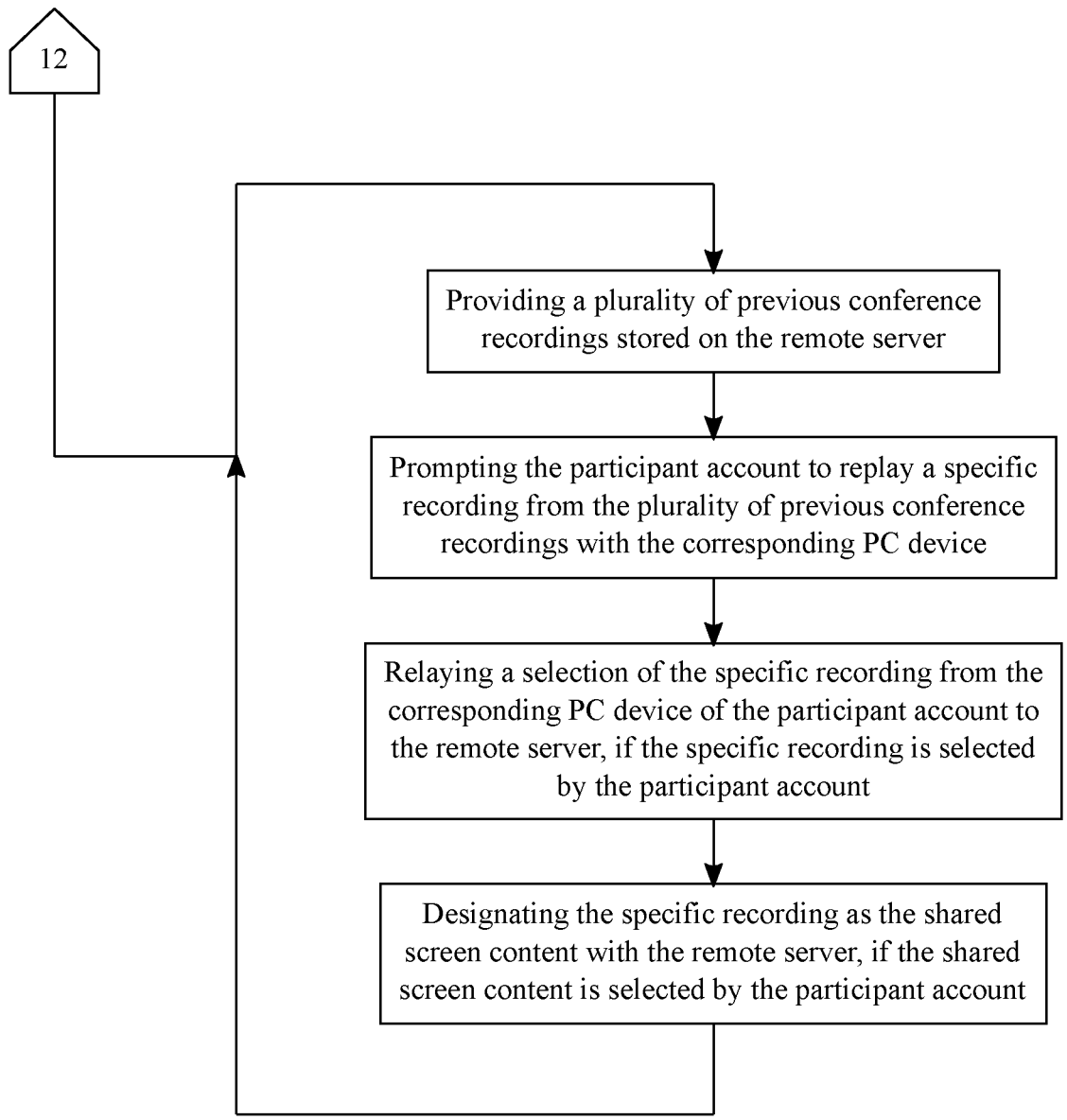
FIG. 13 is a flowchart depicting a subprocess of relaying a previous conference recording as a shared screen content by the participant account.

In reference to FIG. 13, a sub-process of the present invention comprises the steps of providing a plurality of previous conference recordings stored on the remote server. In other words, the present invention enables access to previous conference recordings during the virtual conference session. Accordingly, the sub-process continues by prompting the participant account to replay a specific recording from the plurality of previous conference recordings with the corresponding PC device. For example, the participant account X may have a tab or button visible on the default background of the corresponding PC, from where the participant account X can access the plurality of previous conference recordings and select a specific recording or any single recording by clicking a button or thumbnail associated with that specific recording. Further, the sub-process continues by relaying a selection of the specific recording from the corresponding PC device of the participant account to the remote server, if the specific recording is selected by the host account. In other words, once the participant account selects the specific recording from the plurality of previous conference recordings, that specific recording is relayed or transferred from the participant account to the remote server, so that the specific recording may be streamed to the plurality of attendee accounts. To that end, the sub-process continues by designating the specific recording as the shared screen content with the remote server, if the shared screen content is selected by the participant account. In other words, selection of the specific recording is followed by sharing of the specific recording as the shared screen content of the virtual conference session. This is so that the plurality of attendee accounts may be reminded of what happened in a previous video conference and subsequent action in reference to that previous video conference may be taken during the course of the current virtual conference session.

Figure 14:
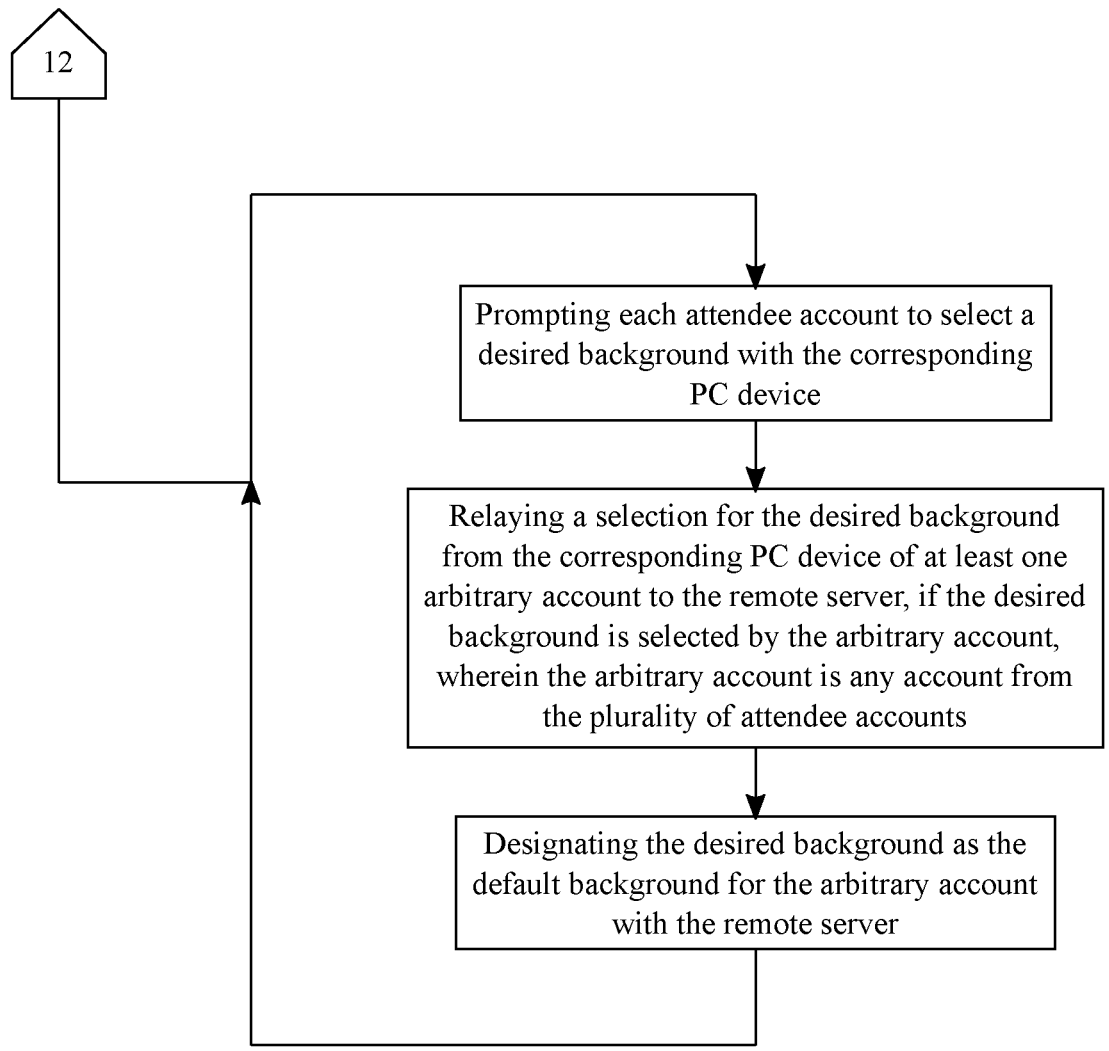
FIG. 14 is a flowchart depicting a subprocess of selecting and designating a desired background as the default background.

As can be seen in FIG. 14, a sub-process of the present invention comprises the steps of prompting each attendee account to select a desired background with the corresponding PC device. The desired background is a background for the virtual conference session that each attendee account can select with their corresponding PC device. Accordingly, the sub-process continues by relaying a selection for the desired background from the corresponding PC device of at least one arbitrary account to the remote server, if the desired background is selected by the arbitrary account, wherein the arbitrary account is any account from the plurality of attendee accounts. In other words, any user from the plurality of attendee accounts can select the desired background with the help of the remote server, and that selection is relayed to the corresponding PC device of that arbitrary account. For example, if an arbitrary account Z from the plurality of attendee accounts selects the photo of an elephant as the desired background, then desired background of the elephant's photograph is relayed only to the corresponding PC device of arbitrary account Z. Further, the sub-process continues by designating the desired background as the default background for the arbitrary account with the remote server. In other words, the above sub-process of the present invention allows each of the plurality of attendee accounts to select a background of their choice as the background for the virtual conference session regardless of what the default background of their corresponding PC is.

Figure 15:
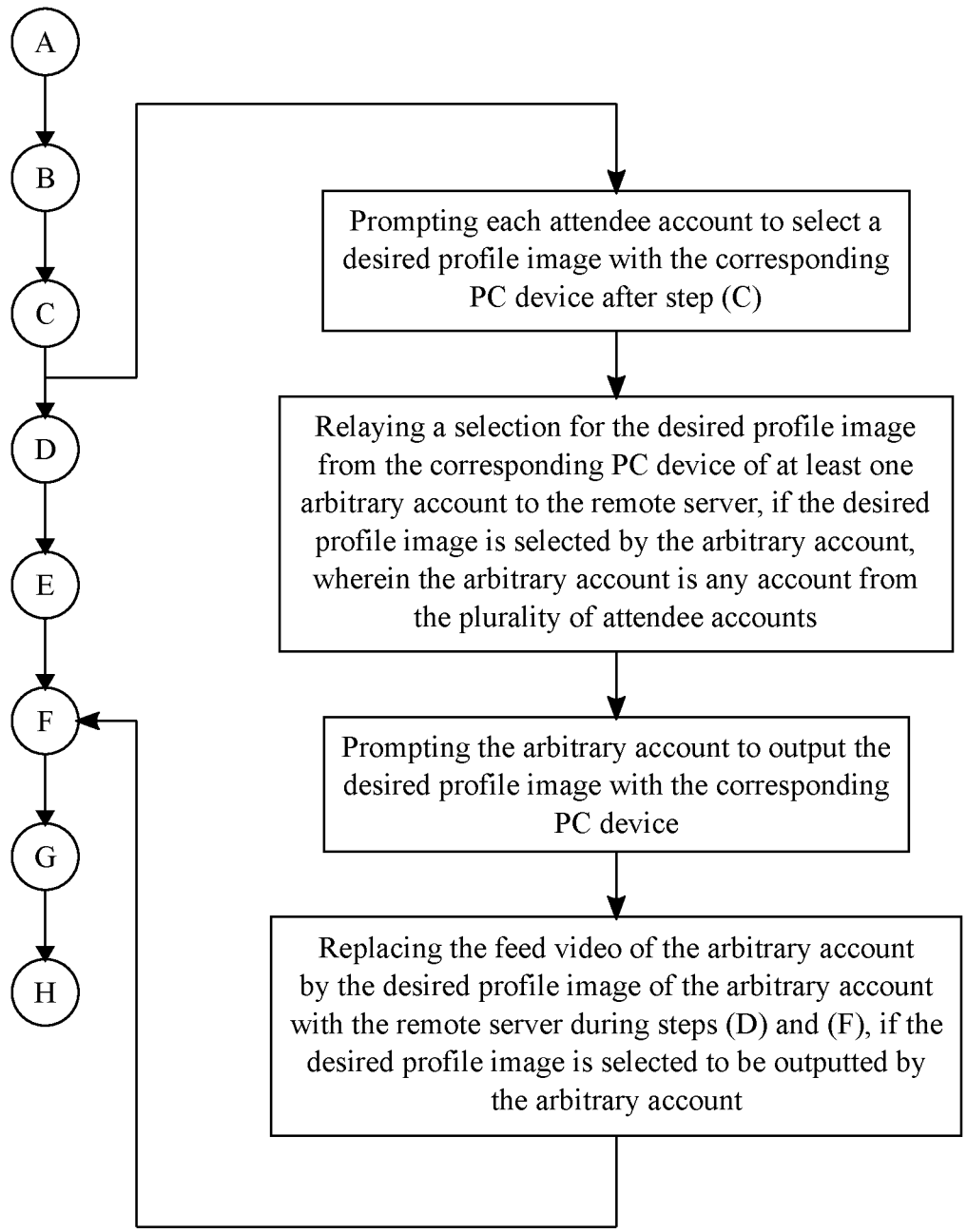
FIG. 15 is a flowchart depicting a subprocess of replacing the feed video with a desired profile image.

As can be seen in FIG. 15, a sub-process of the present invention comprises prompting each attendee account to select a desired profile image with the corresponding PC device after Step C. A desired profile image may be a photograph, a picture with initials or full name of the user or any other random still/motion picture that each attendee decides to display as their feed video during the virtual conference session. Accordingly, the sub-process continues by relaying a selection for the desired profile image from the corresponding PC device of at least one arbitrary account to the remote server, if the desired profile image is selected by the arbitrary account, wherein the arbitrary account is any account from the plurality of attendee accounts. For example, if the arbitrary account holder A decides to select a picture of an apple from the corresponding PC device of account holder A and selects that picture, then that picture of the apple is selected as the desired profile image of arbitrary account holder A. Further, the sub-process continues by replacing the feed video of the arbitrary account by the desired profile image of the arbitrary account with the remote server during Step D and Step F, if the desired profile image is selected to be outputted by the arbitrary account. In other words, once the desired profile image is selected, then that profile image is displayed as the feed video of arbitrary account holder A during the virtual conference session.

Figure 16:
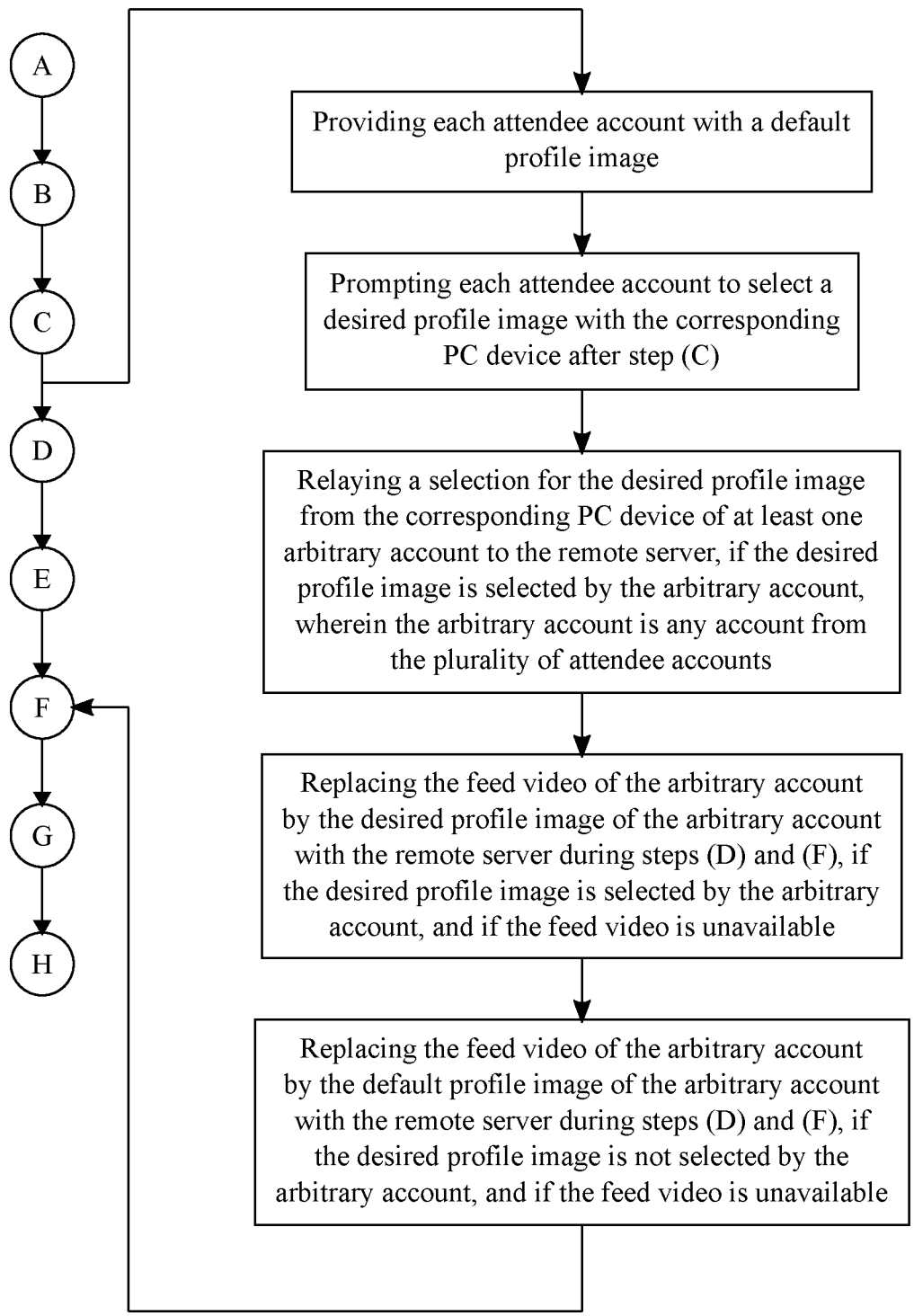
FIG. 16 is a flowchart depicting a subprocess of replacing the feed video with a default profile image.

In reference to FIG. 16, a sub-process of the present invention comprises providing each attendee account with a default profile image. A default profile image may be a photograph of the user, a picture of the initials of the user's name, or full name of the user that is stored as the default image for the user's account during account registration of the user account or simple initials of the user's name, that is automatically selected by the corresponding PC device. For example, if the user's name is Isaac Thomas, the default profile image of that user's account may be 'IT'. Further, the sub-process continues by prompting each attendee account to select a desired profile image with the corresponding PC device after Step C. As previously described, the desired profile image may be a photograph, a picture with initials or full name of the user, or any other random still/motion picture that each attendee decides to display as their feed video during the virtual conference session. Furthermore, the subprocess continues by relaying a selection for the desired profile image from the corresponding PC device of at least one arbitrary account to the remote server, if the desired profile image is selected by the arbitrary account, wherein the arbitrary account is any account from the plurality of attendee accounts. In other words, the selected profile image of the arbitrary account holder is relayed to the remote server. The subprocess further continues by replacing the feed video of the arbitrary account by the desired profile image of the arbitrary account with the remote server during Steps D and F, if the desired profile image is selected by the arbitrary account, and if the feed video is unavailable. However, in an alternate event, where the arbitrary account holder did not select a desired profile image, then the feed video displayed is the default profile image. More specifically, the subprocess continues by replacing the feed video of the arbitrary account by the default profile image of the arbitrary account with the remote server during Steps D and F, if the desired profile image is not selected by the arbitrary account, and if the feed video is unavailable. For example, if the name of the arbitrary account holder is Thomas Edison, and he did not select a desired profile image and he did not turn on the camera of this corresponding PC device, then during the virtual conference session, the initials 'TE' is displayed as the feed video of the arbitrary account holder.

Figure 17:
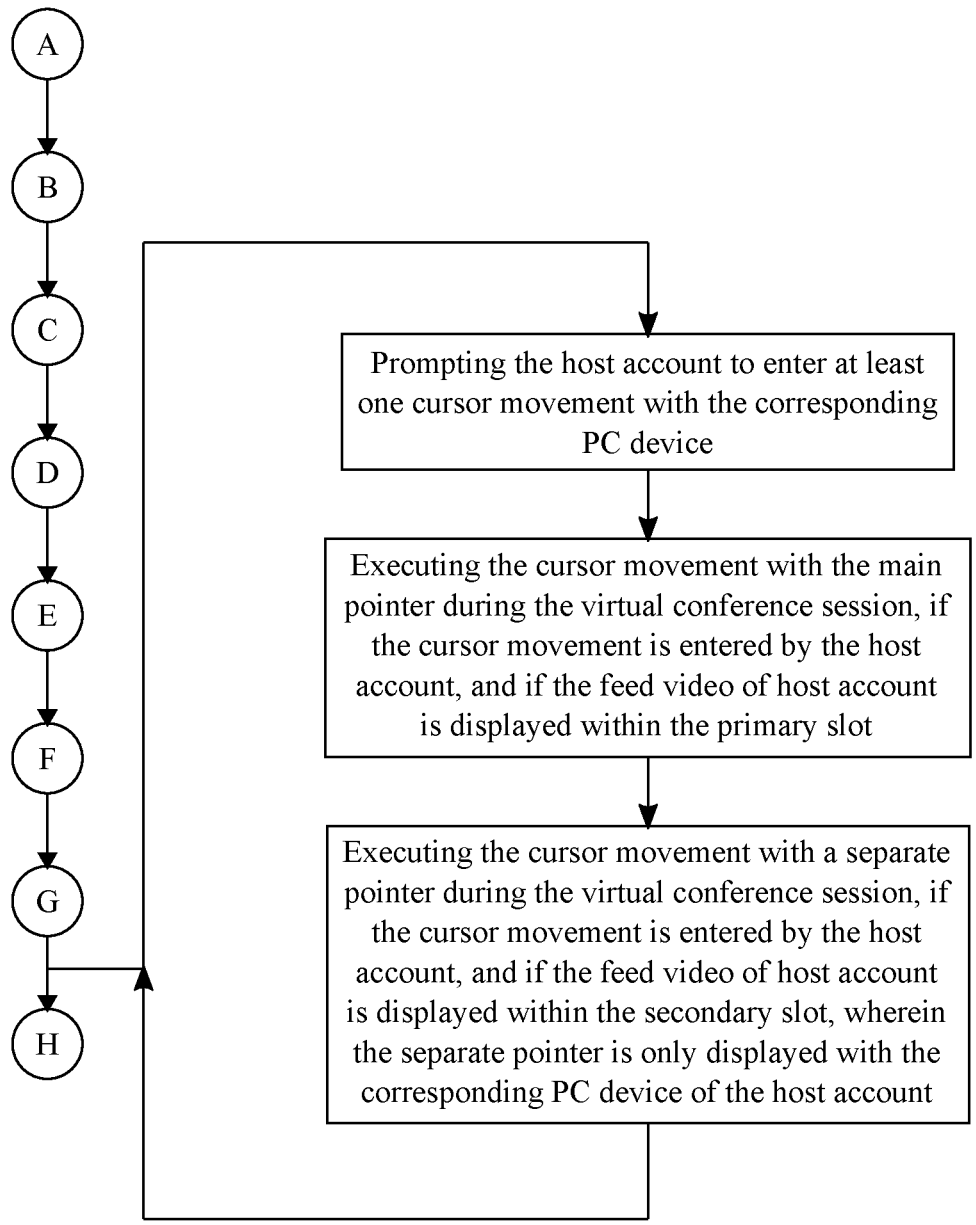
FIG. 17 is a flowchart depicting a subprocess of executing cursor movement by the host account.
Figure 19:
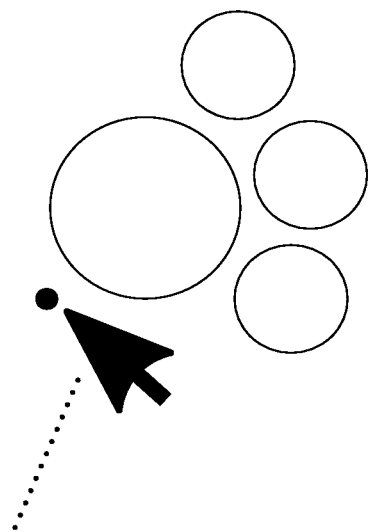
FIG. 19 is a schematic view of the pointer assembly and the cursor according to the operator view.
Figure 20:
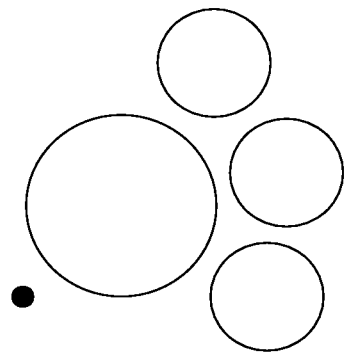
FIG. 20 is a schematic view of the pointer assembly and the cursor according to the participant view.

Continuing with the preferred embodiment and as seen in FIG. 17, a sub-process of the present invention comprises the steps of prompting the host account to enter at least one cursor movement with the corresponding PC device. The at least one cursor movement relates to movement of an arrow cursor on the default background of the corresponding PC of the host account, that is actuated by movement of a mouse, movement of a finger over a touchpad, movement of a stylus or a surface pen over a screen of the corresponding PC device, etc. The sub-process continues by executing the cursor movement with the main pointer during the virtual conference session, if the cursor movement is entered by the host account, and if the feed video of host account is displayed within the primary slot. In other words, if the cursor movement is entered by the host account who is also leading the virtual conference session, the cursor moves with the main pointer during the virtual conference session. More specifically, as seen in FIG. 19, as the arrow cursor on the corresponding PC device of the host account moves, the main pointer or the pointer assembly follows the cursor movement on the corresponding PC device of the host account, for movements such as scroll follow, clicking to the next html page, etc. Alternately, the sub-process continues by executing the cursor movement with a separate pointer during the virtual conference session, if the cursor movement is entered by the host account, and if the feed video of host account is displayed within the secondary slot, wherein the separate pointer is only displayed with the corresponding PC device of the host account. In other words, if the host account is not leading the virtual conference session and the feed video of the host account is displayed within the secondary slot, then the cursor movement does not follow the pointer assembly. In this case, the cursor movement is displayed as movement of a separate pointer. Here the separate pointer is free, can move independently of the pointer assembly, and is displayed only on the corresponding PC device of the host account. This feature is beneficial as the separate pointer can freely move and click on the primary slot, if there is a need for the host account in the secondary slot to take back control or lead the virtual conference session. As seen in FIG. 19 and FIG. 20, the cursor and the separate pointer are arrows. However, the cursor can take any other shape such as a hand shape, a finger shape, an alphabet shape, etc.

In an alternate embodiment, the cursor movement and the main pointer are separate. More specifically, in this embodiment, when the cursor moves to a new position, then the main pointer (and thus the pointer assembly) follows with a slight delay. This is so that, the host account is able to click on participant videos and switch control during the virtual conference session.

Figure 18:
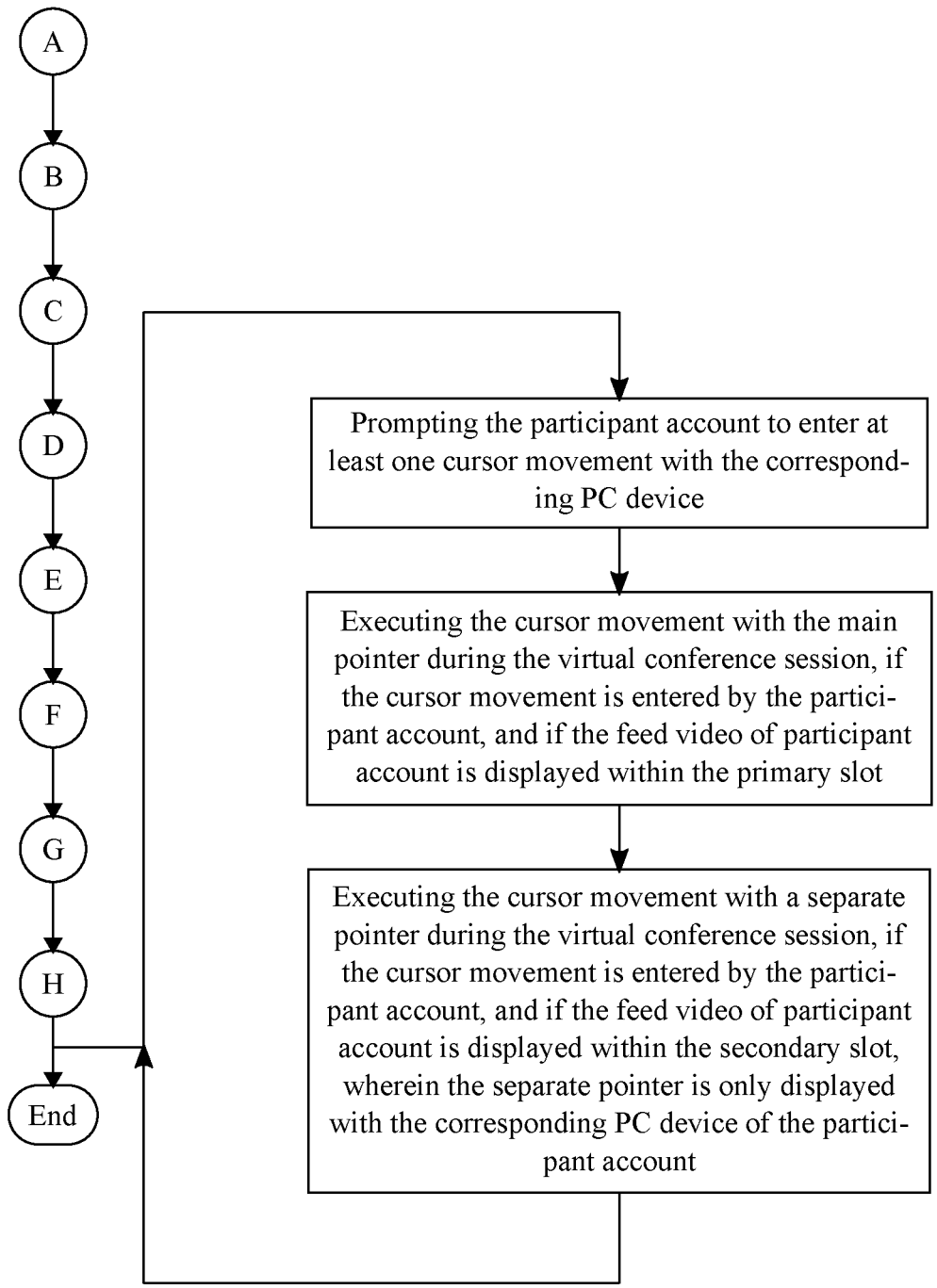
FIG. 18 is a flowchart depicting a subprocess of executing cursor movement by the participant account.

As seen in FIG. 18, a sub-process of the present invention comprises the steps of prompting the participant account to enter at least one cursor movement with the corresponding PC device. The at least one cursor movement relates to movement of an arrow cursor on the default background of the corresponding PC of the participant account, that is actuated by movement of a mouse, movement of a finger over a laptop touchpad, movement of a stylus or a surface pen over a screen of the corresponding PC device etc. The sub-process continues by executing the cursor movement with the main pointer during the virtual conference session, if the cursor movement is entered by the participant account, and if the feed video of participant account is displayed within the primary slot. In other words, if the cursor movement is entered by the participant account who is also leading the virtual conference session, the cursor moves with the main pointer during the virtual conference session. More specifically, as seen in FIG. 20, as the arrow cursor on the corresponding PC device of the participant account moves, the main pointer or the pointer assembly follows the cursor movement on the corresponding PC device of the participant account, for movements such as scroll follow, clicking to the next html page, etc. Alternately, the sub-process continues by executing the cursor movement with a separate pointer during the virtual conference session, if the cursor movement is entered by the participant account, and if the feed video of participant account is displayed within the secondary slot, wherein the separate pointer is only displayed with the corresponding PC device of the participant account. In other words, if the participant account is not leading the virtual conference session and the feed video of the participant account is displayed within the secondary slot, then the cursor movement does not follow the pointer assembly. In this case, the cursor movement is displayed as movement of a separate pointer. Here the separate pointer is free, can move independently of the pointer assembly, and is displayed only on the corresponding PC device of the participant account. This feature is beneficial as the separate pointer can freely move and click on the primary slot, if there is a need for the participant account in the secondary slot to take back control or lead the virtual conference session.

In the preferred embodiment, and as seen in FIG. 19 and FIG. 20, the primary slot is graphically arranged adjacent to the main pointer, and the secondary slot is graphically arranged adjacent to the primary slot, offset from the main pointer. Preferably, the primary slot and the secondary slot are circles or bubble shaped. However, the primary slot and the secondary slot may comprise any other shape, size, orientation, location, etc., as long as the intents of the present invention are not hindered. Furthermore, a graphical size of the primary slot is larger than a graphical size of the secondary slot. This is so that these contrastable graphical spaces enable easier identification of the feed video of the host account that is leading the virtual conference session from the rest of the feed video of the plurality of attendees, within the pointer assembly.

Figure 5:
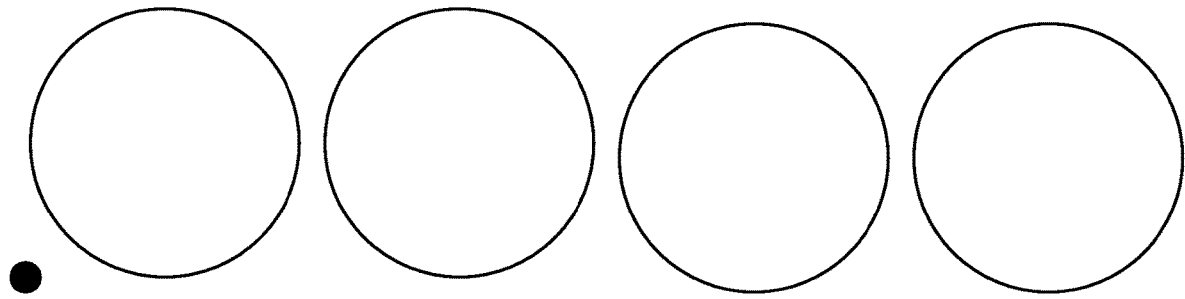
FIG. 5 is a schematic view of the pointer assembly according to a fourth embodiment, wherein the primary slot and the secondary slot are circular in shape and linear in arrangement.

In an alternate embodiment, a graphical size of the primary slot is equal to a graphical size of the secondary slot, as seen in FIG. 5.

Figure 21:
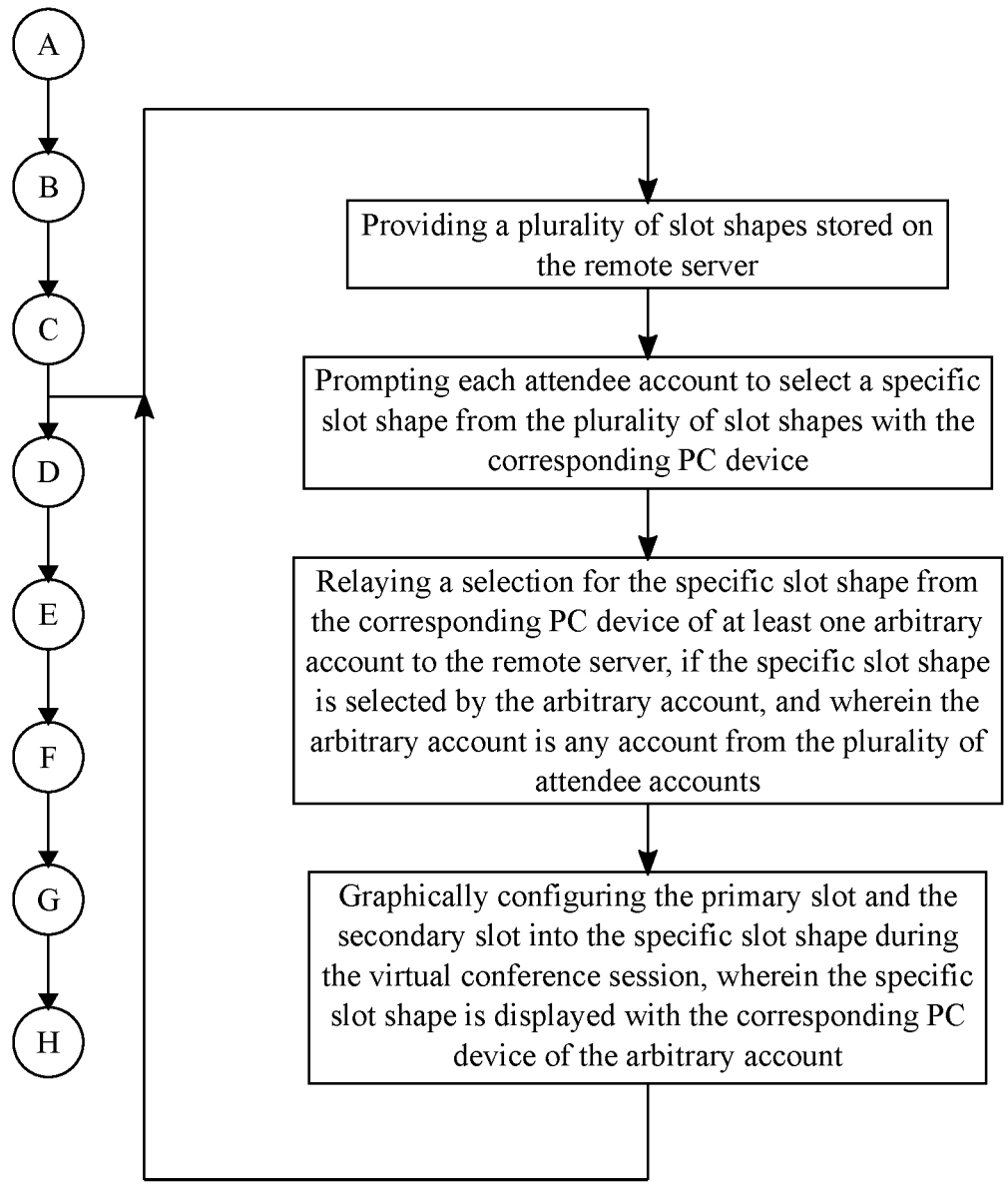
FIG. 21 is a flowchart depicting a subprocess of selecting and relaying a specific slot shape for the primary slot and the secondary slot.

In reference to FIG. 21, a sub-process of the present invention comprises the steps of providing a plurality of slot shapes stored on the remote server. The plurality of slot shapes refers to shapes in which the feed video of the plurality of attendees are displayed. Examples of slot shapes include, but are not limited to, circles, triangles, rectangles, human head shape, etc. Further, the sub-process continues by prompting each attendee account to select a specific slot shape from the plurality of slot shapes with the corresponding PC device. In other words, each attendee can select a specific shape of their choice from the plurality of slot shapes. The sub-process continues by relaying a selection for the specific slot shape from the corresponding PC device of at least one arbitrary account to the remote server, if the specific slot shape is selected by the arbitrary account, and wherein the arbitrary account is any account from the plurality of attendee accounts. In other words, if a slot shape selection is made by any arbitrary account from the plurality of attendee accounts, that slot shape is relayed to the remote server. Furthermore, the sub-process continues by graphically configuring the primary slot and the secondary slot into the specific slot shape during the virtual conference session, wherein the specific slot shape is displayed with the corresponding PC device of the arbitrary account. For example, if the arbitrary account selected a triangular shape as the specific slot shape, the primary slot and the secondary slot are graphically configured into triangular shapes, and that triangular slot shape is displayed with the corresponding PC device of the arbitrary account.

Figure 22:
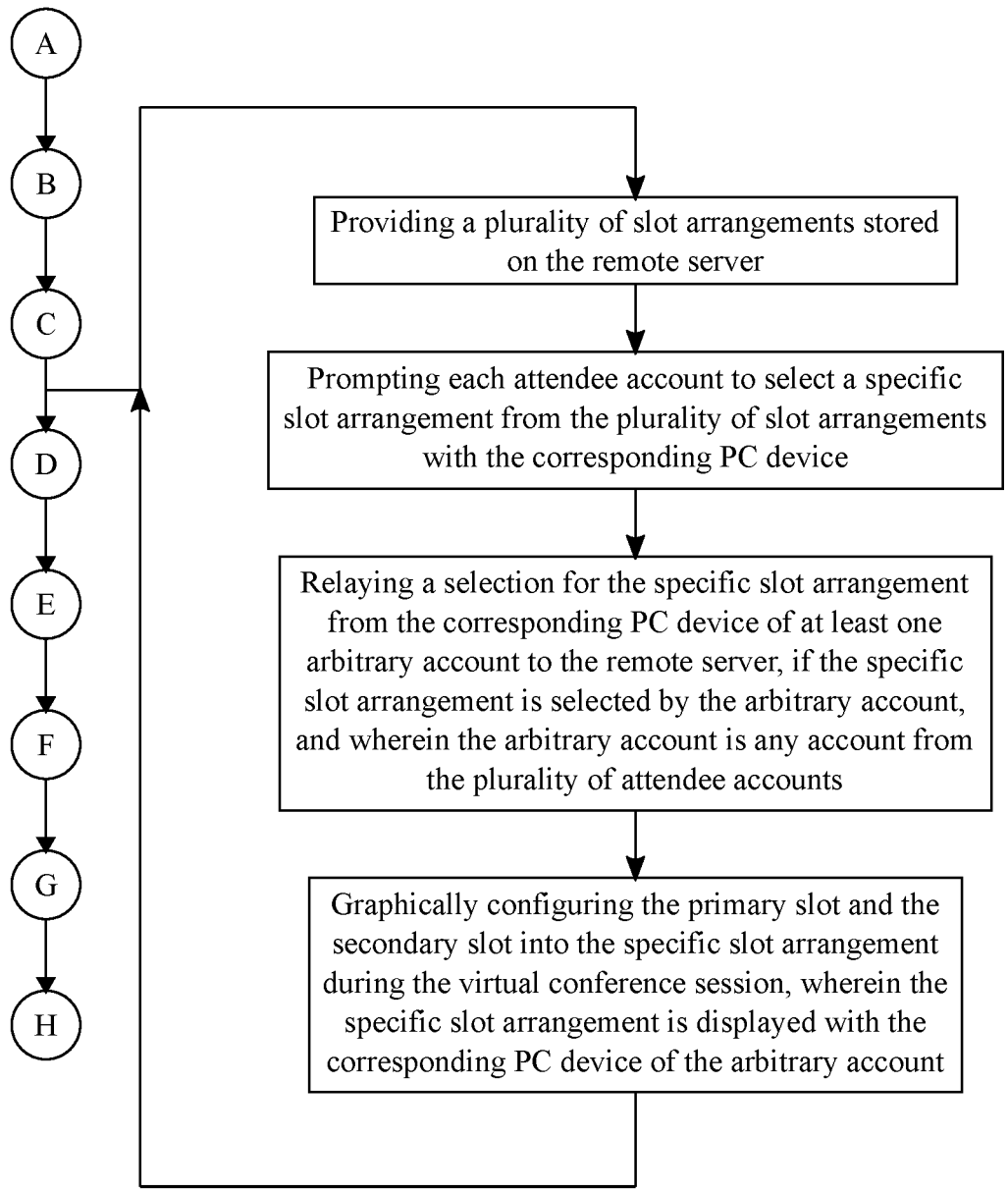
FIG. 22 is a flowchart depicting a subprocess of selecting and relaying a specific slot arrangement for the primary slot and the secondary slot.

As seen in FIG. 22, a sub-process of the present invention comprises the steps of providing a plurality of slot arrangements stored on the remote server. Slot arrangements refer to the arrangement of primary slot and secondary slot with respect to one another. The sub-process continues by prompting each attendee account to select a specific slot arrangement from the plurality of slot arrangements with the corresponding PC device. In other words, each attendee can select a specific slot arrangement of their choice from the plurality of slot arrangements. The sub-process continues by relaying a selection for the specific slot arrangement from the corresponding PC device of at least one arbitrary account to the remote server, if the specific slot arrangement is selected by the arbitrary account, and wherein the arbitrary account is any account from the plurality of attendee accounts. In other words, if a slot arrangement selection is made by any arbitrary account from the plurality of attendee accounts, that slot arrangement is relayed to the remote server. Further, the sub-process continues by graphically configuring the primary slot and the secondary slot into the specific slot arrangement during the virtual conference session, wherein the specific slot arrangement is displayed with the corresponding PC device of the arbitrary account. For example, if the arbitrary account selected a linear arrangement as the specific slot arrangement, the primary slot and the secondary slot are graphically configured into a straight line, and that linear arrangement is displayed with the corresponding PC device of the arbitrary account.

In the preferred embodiment, the at least one participant account is a plurality of participant accounts, and the at least one secondary slot is a plurality of secondary slots, and a plurality of session slots includes the primary slot and the plurality of secondary slots. As seen in FIG. 3 and FIG. 4, the plurality of secondary slots is graphically arranged in an arc about the primary slot, and the arc is graphically arranged adjacent to the primary slot, offset from the main pointer. Further, in this embodiment, the feed video of each attendee account is displayed within a corresponding slot from the plurality of session slots.

In an alternate embodiment, and in reference to FIG. 5, the at least one participant account is a plurality of participant accounts, and the at least one secondary slot is a plurality of secondary slots, and a plurality of session slots includes the primary slot and the plurality of secondary slots. In this embodiment, the plurality of secondary slots is graphically arranged in a line originating from the primary slot, and the feed video of each attendee account is displayed within a corresponding slot from the plurality of session slots.

Although the invention has been explained in relation to its preferred embodiment, it is to be understood that many other possible modifications and variations can be made without departing from the spirit and scope of the invention.

What is claimed is:

1. A method for managing a graphic user interface (GUI) for a virtual conference call, the method comprising the steps of:
   (A) providing a plurality of user accounts managed by at least one remote server, wherein each user account is associated with a corresponding personal computing (PC) device;
   (B) providing at least one virtual conference session managed by the remote server, wherein the virtual conference session includes a plurality of attendee accounts and a pointer assembly, and wherein the attendee accounts are designated from the plurality of user accounts, and wherein the attendee accounts include a host account and at least one participant account, and wherein the pointer assembly includes a main pointer, a primary slot, and at least one secondary slot;
   (C) receiving a feed video from each attendee account with the corresponding PC device;
   (D) initially displaying the feed video of the host account within the primary slot and the feed video of the participant account within the secondary slot during the virtual conference session;
   (E) prompting the participant account to graphically click on the primary slot with the corresponding PC device in order to switch the feed video of the participant account into the primary slot;
   (F) displaying the feed video of the participant account within the primary slot and the feed video of the host account within the secondary slot during the virtual conference session, if the primary slot is graphically clicked by the participant account;
   (G) enabling control of the main pointer with the corresponding PC device of the host account during the virtual conference session, if the feed video of host account is displayed within the primary slot;
   (H) enabling control of the main pointer with the corresponding PC device of the participant account during the virtual conference session, if the feed video of the participant account is displayed within the primary slot; and
   graphically arranging a plurality of secondary slots in an arc about the primary slot or in a line originating from the primary slot during the virtual conference session, if the at least one participant account is a plurality of participant accounts, and if the at least one secondary slot is the plurality of secondary slots, and wherein the arc is graphically arranged adjacent to the primary slot, offset from the main pointer, and wherein a plurality of session slots includes the primary slot and the plurality of secondary slots, and wherein the feed video of each attendee account is displayed within a corresponding slot from the plurality of session slots.

2. The method as claimed in claim 1 comprising the steps of:
   prompting the host account to graphically click on the primary slot with the corresponding PC device after step (G) in order to switch the feed video of the host account into the primary slot; and
   displaying the feed video of the host account within the primary slot and the feed video of the participant account within the secondary slot during the virtual conference session, if the primary slot is graphically clicked by the host account.

3. The method as claimed in claim 1 comprising the steps of:
   providing each attendee account with the default background;
   prompting the host account to select a shared screen content for the virtual conference session with the corresponding PC device, if the host account is in control of the main pointer;
   displaying the shared screen content during the virtual conference session, if the shared screen content is selected by the host account; and
   displaying the default background for each attendee account with the corresponding PC device, if the host account is in control of the main pointer, and if the shared screen content is not selected by the host account.

4. The method as claimed in claim 3 comprising the steps of:
   prompting each attendee account to select a desired background with the corresponding PC device;
   relaying a selection for the desired background from the corresponding PC device of at least one arbitrary account to the remote server, if the desired background is selected by the arbitrary account, wherein the arbitrary account is any account from the plurality of attendee accounts; and
   designating the desired background as the default background for the arbitrary account with the remote server.

5. The method as claimed in claim 3 comprising the steps of:
   providing a plurality of previous conference recordings stored on the remote server;
   prompting the host account to replay a specific recording from the plurality of previous conference recordings with the corresponding PC device;
   relaying a selection of the specific recording from the corresponding PC device of the host account to the remote server, if the specific recording is selected by the host account; and
   designating the specific recording as the shared screen content with the remote server, if the shared screen content is selected by the host account.

6. The method as claimed in claim 1 comprising the steps of:
   providing each attendee account with a default background;

prompting the participant account to select a shared screen content for the virtual conference session with the corresponding PC device, if the participant account is in control of the main pointer;

displaying the shared screen content during the virtual conference session, if the shared screen content is selected by the participant account; and displaying the default background for each attendee account with the corresponding PC device, if the participant account is in control of the main pointer, and if the shared screen content is not selected by the participant account.

7. The method as claimed in claim 6 comprising the steps of:
prompting each attendee account to select a desired background with the corresponding PC device;
relaying a selection for the desired background from the corresponding PC device of at least one arbitrary account to the remote server, if the desired background is selected by the arbitrary account, wherein the arbitrary account is any account from the plurality of attendee accounts; and
designating the desired background as the default background for the arbitrary account with the remote server.

8. The method as claimed in claim 6 comprising the steps of:
providing a plurality of previous conference recordings stored on the remote server;
prompting the participant account to replay a specific recording from the plurality of previous conference recordings with the corresponding PC device;
relaying a selection of the specific recording from the corresponding PC device of the participant account to the remote server, if the specific recording is selected by the participant account; and
designating the specific recording as the shared screen content with the remote server, if the shared screen content is selected by the participant account.

9. The method as claimed in claim 1 comprising the steps of:
prompting each attendee account to select a desired profile image with the corresponding PC device after step (C);
relaying a selection for the desired profile image from the corresponding PC device of at least one arbitrary account to the remote server, if the desired profile image is selected by the arbitrary account, wherein the arbitrary account is any account from the plurality of attendee accounts;
prompting the arbitrary account to output the desired profile image with the corresponding PC device; and
replacing the feed video of the arbitrary account by the desired profile image of the arbitrary account with the remote server during steps (D) and (F), if the desired profile image is selected to be outputted by the arbitrary account.

10. The method as claimed in claim 1 comprising the steps of:
providing each attendee account with a default profile image;
prompting each attendee account to select a desired profile image with the corresponding PC device after step (C);
relaying a selection for the desired profile image from the corresponding PC device of at least one arbitrary account to the remote server, if the desired profile image is selected by the arbitrary account, wherein the arbitrary account is any account from the plurality of attendee accounts;
replacing the feed video of the arbitrary account by the desired profile image of the arbitrary account with the remote server during steps (D) and (F), if the desired profile image is selected by the arbitrary account, and if the feed video is unavailable; and
replacing the feed video of the arbitrary account by the default profile image of the arbitrary account with the remote server during steps (D) and (F), if the desired profile image is not selected by the arbitrary account, and if the feed video is unavailable.

11. The method as claimed in claim 1 comprising the steps of:
prompting the host account to enter at least one cursor movement with the corresponding PC device;
executing the cursor movement with the main pointer during the virtual conference session, if the cursor movement is entered by the host account, and if the feed video of host account is displayed within the primary slot; and
executing the cursor movement with a separate pointer during the virtual conference session, if the cursor movement is entered by the host account, and if the feed video of host account is displayed within the secondary slot, wherein the separate pointer is only displayed with the corresponding PC device of the host account.

12. The method as claimed in claim 1 comprising the steps of:
prompting the participant account to enter at least one cursor movement with the corresponding PC device;
executing the cursor movement with the main pointer during the virtual conference session, if the cursor movement is entered by the participant account, and if the feed video of participant account is displayed within the primary slot; and
executing the cursor movement with a separate pointer during the virtual conference session, if the cursor movement is entered by the participant account, and if the feed video of participant account is displayed within the secondary slot, wherein the separate pointer is only displayed with the corresponding PC device of the participant account.

13. The method as claimed in claim 1, wherein the primary slot is graphically arranged adjacent to the main pointer, and wherein the secondary slot is graphically arranged adjacent to the primary slot, offset from the main pointer.

14. The method as claimed in claim 1, wherein a graphical size of the primary slot is larger than a graphical size of the secondary slot.

15. The method as claimed in claim 1, wherein a graphical size of the primary slot is equal to a graphical size of the secondary slot.

16. The method as claimed in claim 1 comprising the steps of:
providing a plurality of slot shapes stored on the remote server;
prompting each attendee account to select a specific slot shape from the plurality of slot shapes with the corresponding PC device;
relaying a selection for the specific slot shape from the corresponding PC device of at least one arbitrary account to the remote server, if the specific slot shape is selected by the arbitrary account, and wherein the arbitrary account is any account from the plurality of attendee accounts; and graphically configuring the primary slot and the secondary slot into the specific slot shape during the virtual conference session, wherein the specific slot shape is displayed with the corresponding PC device of the arbitrary account.

17. The method as claimed in claim 1 comprising the steps of:

providing a plurality of slot arrangements stored on the remote server;

prompting each attendee account to select a specific slot arrangement from the plurality of slot arrangements with the corresponding PC device;

relaying a selection for the specific slot arrangement from the corresponding PC device of at least one arbitrary account to the remote server, if the specific slot arrangement is selected by the arbitrary account, and wherein the arbitrary account is any account from the plurality of attendee accounts; and graphically configuring the primary slot and the secondary slot into the specific slot arrangement during the virtual conference session, wherein the specific slot arrangement is displayed with the corresponding PC device of the arbitrary account.

* * * * *